United States Patent
Li et al.

(10) Patent No.: US 11,856,670 B2
(45) Date of Patent: Dec. 26, 2023

(54) SYSTEMS AND METHODS FOR PROVIDING POWER SUPPLY TO CURRENT CONTROLLERS ASSOCIATED WITH LED LIGHTING

(71) Applicant: ON-BRIGHT ELECTRONICS (SHANGHAI) CO., LTD., Shanghai (CN)

(72) Inventors: Zhuoyan Li, Shanghai (CN); Ke Li, Shanghai (CN); Liqiang Zhu, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/081,528

(22) Filed: Dec. 14, 2022

(65) Prior Publication Data
US 2023/0225028 A1 Jul. 13, 2023

Related U.S. Application Data

(63) Continuation of application No. 17/096,741, filed on Nov. 12, 2020, now Pat. No. 11,564,299.

(30) Foreign Application Priority Data

Dec. 19, 2019 (CN) .......................... 201911316902.5

(51) Int. Cl.
*H05B 45/44* (2020.01)
*H05B 45/14* (2020.01)
(52) U.S. Cl.
CPC ............. *H05B 45/44* (2020.01); *H05B 45/14* (2020.01)
(58) Field of Classification Search
CPC ........ H05B 45/44; H05B 45/14; H05B 45/31; H05B 45/395; H05B 45/34; Y02B 20/30
See application file for complete search history.

(56) References Cited

U.S. PATENT DOCUMENTS 3,803,452 A 4/1974 Goldschmied
3,899,713 A 8/1975 Barkan et al.
(Continued)

FOREIGN PATENT DOCUMENTS

CN 1448005 A 10/2003
CN 101040570 A 9/2007
(Continued)

OTHER PUBLICATIONS

China Patent Office, Notice of Allowance dated Sep. 1, 2021, in Application No. 201911371960.8.
(Continued)

*Primary Examiner* — Daniel D Chang
(74) *Attorney, Agent, or Firm* — Faegre Drinker Biddle & Reath LLP

(57) ABSTRACT

System and method for controlling one or more light emitting diodes. For example, the system includes: a power supply controller configured to receive a cathode voltage from a cathode of a diode, the diode including an anode configured to receive a rectified voltage generated by a rectifying bridge, the power supply controller being further configured to generate a first signal based at least in part on the cathode voltage; and a driver configured to receive the first signal and generate a second signal based at least in part on the first signal, the driver being further configured to output the second signal to a gate terminal of a transistor, the transistor including a source terminal coupled to the driver and a first resistor, the transistor further including a drain terminal coupled to the one or more light emitting diodes and an output capacitor connected to the cathode of the diode.

23 Claims, 5 Drawing Sheets

(56) References Cited

U.S. PATENT DOCUMENTS

| | | |
|---|---|---|
| 4,253,045 A | 2/1981 | Weber |
| 5,144,205 A | 9/1992 | Motto et al. |
| 5,249,298 A | 9/1993 | Bolan et al. |
| 5,504,398 A | 4/1996 | Rothenbuhler |
| 5,949,197 A | 9/1999 | Kastner |
| 6,196,208 B1 | 3/2001 | Masters |
| 6,218,788 B1 | 4/2001 | Chen et al. |
| 6,229,271 B1 | 5/2001 | Liu |
| 6,278,245 B1 | 8/2001 | Li et al. |
| 7,038,399 B2 | 5/2006 | Lys et al. |
| 7,649,327 B2 | 1/2010 | Peng |
| 7,759,881 B1 | 7/2010 | Melanson |
| 7,825,715 B1 | 11/2010 | Greenberg |
| 7,880,400 B2 | 2/2011 | Zhou et al. |
| 7,944,153 B2 | 5/2011 | Greenfeld |
| 8,018,171 B1 | 9/2011 | Melanson et al. |
| 8,098,021 B2 | 1/2012 | Wang et al. |
| 8,129,976 B2 | 3/2012 | Blakeley |
| 8,134,302 B2 | 3/2012 | Yang et al. |
| 8,278,832 B2 | 10/2012 | Hung et al. |
| 8,373,313 B2 | 2/2013 | Garcia et al. |
| 8,378,583 B2 | 2/2013 | Hying et al. |
| 8,378,588 B2 | 2/2013 | Kuo et al. |
| 8,378,589 B2 | 2/2013 | Kuo et al. |
| 8,415,901 B2 | 4/2013 | Recker et al. |
| 8,432,438 B2 | 4/2013 | Ryan et al. |
| 8,497,637 B2 | 7/2013 | Liu |
| 8,558,477 B2 | 10/2013 | Bordin et al. |
| 8,569,956 B2 | 10/2013 | Shteynberg et al. |
| 8,644,041 B2 | 2/2014 | Pansier |
| 8,653,750 B2 | 2/2014 | Deurenberg et al. |
| 8,686,668 B2 | 4/2014 | Grotkowski et al. |
| 8,698,419 B2 | 4/2014 | Yan et al. |
| 8,716,882 B2 | 5/2014 | Pettler et al. |
| 8,742,674 B2 | 6/2014 | Shteynberg et al. |
| 8,829,819 B1 | 9/2014 | Angeles et al. |
| 8,890,440 B2 | 11/2014 | Yan et al. |
| 8,896,288 B2 | 11/2014 | Choi et al. |
| 8,941,323 B1 | 1/2015 | Wu et al. |
| 8,941,324 B2 | 1/2015 | Zhou et al. |
| 8,941,328 B2 | 1/2015 | Wu et al. |
| 8,947,010 B2 | 2/2015 | Barrow et al. |
| 9,030,122 B2 | 5/2015 | Yan et al. |
| 9,084,316 B2 | 7/2015 | Melanson et al. |
| 9,131,581 B1 | 9/2015 | Hsia et al. |
| 9,148,050 B2 | 9/2015 | Chiang |
| 9,167,638 B2 | 10/2015 | Le |
| 9,173,258 B2 | 10/2015 | Ekbote |
| 9,207,265 B1 | 12/2015 | Grisamore et al. |
| 9,220,133 B2 | 12/2015 | Salvestrini et al. |
| 9,220,136 B2 | 12/2015 | Zhang et al. |
| 9,247,623 B2 | 1/2016 | Recker et al. |
| 9,247,625 B2 | 1/2016 | Recker et al. |
| 9,301,349 B2 | 3/2016 | Zhu et al. |
| 9,332,609 B1 | 5/2016 | Rhodes et al. |
| 9,402,293 B2 | 7/2016 | Vaughan et al. |
| 9,408,269 B2 | 8/2016 | Zhu et al. |
| 9,414,455 B2 | 8/2016 | Zhou et al. |
| 9,467,137 B2 | 10/2016 | Eum et al. |
| 9,480,118 B2 | 10/2016 | Liao et al. |
| 9,485,833 B2 | 11/2016 | Datta et al. |
| 9,554,432 B2 | 1/2017 | Zhu et al. |
| 9,572,224 B2 | 2/2017 | Gaknoki et al. |
| 9,585,222 B2 | 2/2017 | Zhu et al. |
| 9,655,188 B1 | 5/2017 | Lewis et al. |
| 9,661,702 B2 | 5/2017 | Mednik et al. |
| 9,723,676 B2 | 8/2017 | Ganick et al. |
| 9,750,107 B2 | 8/2017 | Zhu et al. |
| 9,781,786 B2 | 10/2017 | Ho et al. |
| 9,820,344 B1 | 11/2017 | Papanicolaou |
| 9,883,561 B1 | 1/2018 | Liang et al. |
| 9,883,562 B2 | 1/2018 | Zhu et al. |
| 9,961,734 B2 | 5/2018 | Zhu et al. |
| 10,054,271 B2 | 8/2018 | Xiong et al. |
| 10,153,684 B2 | 12/2018 | Liu et al. |
| 10,194,500 B2 | 1/2019 | Zhu et al. |
| 10,264,642 B2 | 4/2019 | Liang et al. |
| 10,292,217 B2 | 5/2019 | Zhu et al. |
| 10,299,328 B2 | 5/2019 | Fu et al. |
| 10,334,677 B2 | 6/2019 | Zhu et al. |
| 10,342,087 B2 | 7/2019 | Zhu et al. |
| 10,362,643 B2 | 7/2019 | Kim et al. |
| 10,375,785 B2 | 8/2019 | Li et al. |
| 10,383,187 B2 | 8/2019 | Liao et al. |
| 10,405,392 B1 | 9/2019 | Shi et al. |
| 10,447,171 B2 | 10/2019 | Newman et al. |
| 10,448,469 B2 | 10/2019 | Zhu et al. |
| 10,448,470 B2 | 10/2019 | Zhu et al. |
| 10,455,657 B2 | 10/2019 | Zhu et al. |
| 10,499,467 B2 | 12/2019 | Wang |
| 10,512,131 B2 | 12/2019 | Zhu et al. |
| 10,530,268 B2 | 1/2020 | Newman et al. |
| 10,531,534 B1 * | 1/2020 | Zhou .................. H05B 45/20 |
| 10,568,185 B1 | 2/2020 | Ostrovsky et al. |
| 10,616,975 B2 | 4/2020 | Gotou et al. |
| 10,687,397 B2 | 6/2020 | Zhu et al. |
| 10,785,837 B2 | 9/2020 | Li et al. |
| 10,827,588 B2 | 11/2020 | Zhu et al. |
| 10,973,095 B2 | 4/2021 | Zhu et al. |
| 10,999,903 B2 | 5/2021 | Li et al. |
| 10,999,904 B2 | 5/2021 | Zhu et al. |
| 11,026,304 B2 | 6/2021 | Li et al. |
| 11,183,996 B2 | 11/2021 | Zhu et al. |
| 11,201,612 B2 | 12/2021 | Zhu et al. |
| 11,206,015 B2 | 12/2021 | Zhu et al. |
| 11,212,885 B2 | 12/2021 | Liao et al. |
| 11,224,105 B2 | 1/2022 | Yang et al. |
| 11,252,799 B2 | 2/2022 | Li et al. |
| 11,297,704 B2 | 4/2022 | Zhu et al. |
| 11,405,992 B2 | 8/2022 | Li et al. |
| 11,564,299 B2 | 1/2023 | Li et al. |
| 11,570,859 B2 | 1/2023 | Zhu et al. |
| 2006/0022648 A1 | 2/2006 | Ben-Yaakov et al. |
| 2007/0182338 A1 | 8/2007 | Shteynberg et al. |
| 2007/0182699 A1 | 8/2007 | Ha et al. |
| 2007/0267978 A1 | 11/2007 | Shteynberg et al. |
| 2008/0224629 A1 | 9/2008 | Melanson |
| 2008/0224633 A1 | 9/2008 | Melanson et al. |
| 2008/0278092 A1 | 11/2008 | Lys et al. |
| 2009/0021469 A1 | 1/2009 | Yeo et al. |
| 2009/0085494 A1 | 4/2009 | Summerland |
| 2009/0251059 A1 | 10/2009 | Veltman |
| 2010/0141153 A1 | 6/2010 | Recker et al. |
| 2010/0148691 A1 * | 6/2010 | Kuo .................. H05B 45/3725 315/291 |
| 2010/0156319 A1 | 6/2010 | Melanson |
| 2010/0164406 A1 | 7/2010 | Kost et al. |
| 2010/0176733 A1 | 7/2010 | King |
| 2010/0207536 A1 | 8/2010 | Burdalski et al. |
| 2010/0213859 A1 | 8/2010 | Shteynberg et al. |
| 2010/0219766 A1 | 9/2010 | Kuo et al. |
| 2010/0231136 A1 | 9/2010 | Reisenauer et al. |
| 2011/0012530 A1 | 1/2011 | Zheng et al. |
| 2011/0037399 A1 | 2/2011 | Hung et al. |
| 2011/0074302 A1 | 3/2011 | Draper et al. |
| 2011/0080110 A1 | 4/2011 | Nuhfer et al. |
| 2011/0080111 A1 | 4/2011 | Nuhfer et al. |
| 2011/0080112 A1 | 4/2011 | Shearer et al. |
| 2011/0101867 A1 | 5/2011 | Wang et al. |
| 2011/0121744 A1 | 5/2011 | Salvestrini et al. |
| 2011/0121754 A1 | 5/2011 | Shteynberg et al. |
| 2011/0133662 A1 | 6/2011 | Yan et al. |
| 2011/0140620 A1 | 6/2011 | Lin et al. |
| 2011/0140621 A1 | 6/2011 | Yi et al. |
| 2011/0187283 A1 | 8/2011 | Wang et al. |
| 2011/0227490 A1 | 9/2011 | Huynh |
| 2011/0260619 A1 | 10/2011 | Sadwick et al. |
| 2011/0285301 A1 | 11/2011 | Kuang et al. |
| 2011/0291583 A1 | 12/2011 | Shen |
| 2011/0309759 A1 | 12/2011 | Shteynberg et al. |
| 2012/0001548 A1 | 1/2012 | Recker et al. |
| 2012/0032604 A1 | 2/2012 | Hontele |
| 2012/0056553 A1 | 3/2012 | Koolen et al. |
| 2012/0069616 A1 | 3/2012 | Kitamura et al. |

(56) References Cited

U.S. PATENT DOCUMENTS

| | | |
|---|---|---|
| 2012/0080944 A1 | 4/2012 | Recker et al. |
| 2012/0081009 A1 | 4/2012 | Shteynberg et al. |
| 2012/0081032 A1 | 4/2012 | Huang |
| 2012/0081035 A1 | 4/2012 | McCune, Jr. |
| 2012/0146526 A1 | 6/2012 | Lam et al. |
| 2012/0181944 A1 | 7/2012 | Jacobs et al. |
| 2012/0181946 A1 | 7/2012 | Melanson |
| 2012/0187857 A1 | 7/2012 | Ulmann et al. |
| 2012/0242237 A1 | 9/2012 | Chen et al. |
| 2012/0262093 A1 | 10/2012 | Recker et al. |
| 2012/0268031 A1 | 10/2012 | Zhou et al. |
| 2012/0274227 A1 | 11/2012 | Zheng et al. |
| 2012/0286679 A1 | 11/2012 | Liu |
| 2012/0299500 A1 | 11/2012 | Sadwick et al. |
| 2012/0299501 A1 | 11/2012 | Kost et al. |
| 2012/0299511 A1 | 11/2012 | Montante et al. |
| 2012/0319604 A1 | 12/2012 | Walters |
| 2012/0326616 A1 | 12/2012 | Sumitani et al. |
| 2013/0009561 A1 | 1/2013 | Briggs |
| 2013/0020965 A1 | 1/2013 | Kang et al. |
| 2013/0026942 A1 | 1/2013 | Ryan et al. |
| 2013/0026945 A1 | 1/2013 | Ganick et al. |
| 2013/0027528 A1 | 1/2013 | Staats et al. |
| 2013/0034172 A1 | 2/2013 | Pettler et al. |
| 2013/0043726 A1 | 2/2013 | Krishnamoorthy et al. |
| 2013/0049631 A1 | 2/2013 | Riesebosch |
| 2013/0063047 A1 | 3/2013 | Veskovic |
| 2013/0134904 A1 | 5/2013 | Yau et al. |
| 2013/0141001 A1 | 6/2013 | Datta et al. |
| 2013/0154487 A1 | 6/2013 | Kuang et al. |
| 2013/0162155 A1* | 6/2013 | Matsuda ............... H05B 45/385 315/200 R |
| 2013/0162158 A1 | 6/2013 | Pollischansky |
| 2013/0169177 A1 | 7/2013 | Liao et al. |
| 2013/0175931 A1 | 7/2013 | Sadwick |
| 2013/0181630 A1 | 7/2013 | Taipale et al. |
| 2013/0187568 A1 | 7/2013 | Jelaca et al. |
| 2013/0193866 A1 | 8/2013 | Datta et al. |
| 2013/0193879 A1 | 8/2013 | Sadwick et al. |
| 2013/0194848 A1 | 8/2013 | Bernardinis et al. |
| 2013/0215655 A1 | 8/2013 | Yang et al. |
| 2013/0223107 A1 | 8/2013 | Zhang et al. |
| 2013/0229121 A1 | 9/2013 | Otake et al. |
| 2013/0241427 A1 | 9/2013 | Kesterson et al. |
| 2013/0241428 A1 | 9/2013 | Takeda |
| 2013/0241441 A1 | 9/2013 | Myers et al. |
| 2013/0242622 A1 | 9/2013 | Peng et al. |
| 2013/0249431 A1 | 9/2013 | Shteynberg et al. |
| 2013/0278159 A1 | 10/2013 | Del et al. |
| 2013/0307430 A1 | 11/2013 | Blom |
| 2013/0307431 A1 | 11/2013 | Zhu et al. |
| 2013/0307434 A1 | 11/2013 | Zhang et al. |
| 2013/0342127 A1 | 12/2013 | Pan et al. |
| 2013/0343090 A1 | 12/2013 | Eom et al. |
| 2014/0009082 A1 | 1/2014 | King et al. |
| 2014/0029315 A1 | 1/2014 | Zhang et al. |
| 2014/0049177 A1 | 2/2014 | Kulczycki et al. |
| 2014/0063857 A1 | 3/2014 | Peng et al. |
| 2014/0078790 A1 | 3/2014 | Lin et al. |
| 2014/0103829 A1 | 4/2014 | Kang |
| 2014/0132172 A1 | 5/2014 | Zhu et al. |
| 2014/0160809 A1 | 6/2014 | Lin et al. |
| 2014/0176016 A1 | 6/2014 | Li et al. |
| 2014/0177280 A1 | 6/2014 | Yang et al. |
| 2014/0197760 A1 | 7/2014 | Radermacher |
| 2014/0265898 A1 | 9/2014 | Del et al. |
| 2014/0265907 A1 | 9/2014 | Su et al. |
| 2014/0265935 A1 | 9/2014 | Sadwick et al. |
| 2014/0268935 A1 | 9/2014 | Chiang |
| 2014/0300274 A1 | 10/2014 | Acatrinei |
| 2014/0320031 A1 | 10/2014 | Wu et al. |
| 2014/0333228 A1 | 11/2014 | Angeles et al. |
| 2014/0346973 A1 | 11/2014 | Zhu et al. |
| 2014/0354157 A1 | 12/2014 | Morales |
| 2014/0354165 A1 | 12/2014 | Malyna et al. |
| 2014/0354170 A1 | 12/2014 | Gredler et al. |
| 2015/0015159 A1 | 1/2015 | Wang et al. |
| 2015/0035450 A1 | 2/2015 | Werner |
| 2015/0048757 A1 | 2/2015 | Boonen et al. |
| 2015/0062981 A1 | 3/2015 | Fang et al. |
| 2015/0077009 A1 | 3/2015 | Kunimatsu |
| 2015/0091470 A1 | 4/2015 | Zhou et al. |
| 2015/0137704 A1 | 5/2015 | Angeles et al. |
| 2015/0173140 A1 | 6/2015 | Wu et al. |
| 2015/0312978 A1 | 10/2015 | Vaughan et al. |
| 2015/0312982 A1 | 10/2015 | Melanson |
| 2015/0312988 A1 | 10/2015 | Liao et al. |
| 2015/0318789 A1 | 11/2015 | Yang et al. |
| 2015/0333764 A1 | 11/2015 | Pastore et al. |
| 2015/0357910 A1 | 12/2015 | Murakami et al. |
| 2015/0359054 A1 | 12/2015 | Lin et al. |
| 2015/0366010 A1 | 12/2015 | Mao et al. |
| 2015/0382424 A1 | 12/2015 | Knapp et al. |
| 2016/0014861 A1 | 1/2016 | Zhu et al. |
| 2016/0014865 A1 | 1/2016 | Zhu et al. |
| 2016/0037604 A1 | 2/2016 | Zhu et al. |
| 2016/0113077 A1 | 4/2016 | Akiyama |
| 2016/0119998 A1 | 4/2016 | Linnartz et al. |
| 2016/0128142 A1 | 5/2016 | Arulandu et al. |
| 2016/0134187 A1 | 5/2016 | Pregitzer et al. |
| 2016/0277411 A1 | 9/2016 | Dani et al. |
| 2016/0286617 A1* | 9/2016 | Takahashi ............ H05B 45/3725 |
| 2016/0323957 A1 | 11/2016 | Hu et al. |
| 2016/0338163 A1 | 11/2016 | Zhu et al. |
| 2017/0006684 A1 | 1/2017 | Tu et al. |
| 2017/0027029 A1 | 1/2017 | Hu et al. |
| 2017/0055323 A1 | 2/2017 | Lim et al. |
| 2017/0064787 A1 | 3/2017 | Liao et al. |
| 2017/0099712 A1 | 4/2017 | Hilgers et al. |
| 2017/0181235 A1 | 6/2017 | Zhu et al. |
| 2017/0196063 A1 | 7/2017 | Zhu et al. |
| 2017/0251532 A1 | 8/2017 | Wang et al. |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0035507 A1 | 2/2018 | Kumada et al. |
| 2018/0103520 A1 | 4/2018 | Zhu et al. |
| 2018/0110104 A1 | 4/2018 | Liang et al. |
| 2018/0115234 A1 | 4/2018 | Liu et al. |
| 2018/0139816 A1 | 5/2018 | Liu et al. |
| 2018/0263089 A1 | 9/2018 | Seyler et al. |
| 2018/0288845 A1 | 10/2018 | Zhu et al. |
| 2018/0310376 A1* | 10/2018 | Huang ................... H05B 45/10 |
| 2019/0069364 A1 | 2/2019 | Zhu et al. |
| 2019/0069366 A1 | 2/2019 | Liao et al. |
| 2019/0082507 A1 | 3/2019 | Zhu et al. |
| 2019/0104583 A1 | 4/2019 | Konishi et al. |
| 2019/0124736 A1 | 4/2019 | Zhu et al. |
| 2019/0166667 A1 | 5/2019 | Li et al. |
| 2019/0230755 A1 | 7/2019 | Zhu et al. |
| 2019/0327810 A1 | 10/2019 | Zhu et al. |
| 2019/0350055 A1 | 11/2019 | Wu et al. |
| 2019/0350060 A1 | 11/2019 | Li et al. |
| 2019/0364628 A1 | 11/2019 | Chen et al. |
| 2019/0380183 A1 | 12/2019 | Li et al. |
| 2020/0100340 A1 | 3/2020 | Zhu et al. |
| 2020/0146121 A1 | 5/2020 | Zhu et al. |
| 2020/0205263 A1 | 6/2020 | Zhu et al. |
| 2020/0205264 A1 | 6/2020 | Zhu et al. |
| 2020/0267817 A1 | 8/2020 | Yang et al. |
| 2020/0305247 A1 | 9/2020 | Li et al. |
| 2020/0375001 A1 | 11/2020 | Jung et al. |
| 2021/0007195 A1 | 1/2021 | Zhu et al. |
| 2021/0007196 A1 | 1/2021 | Zhu et al. |
| 2021/0045213 A1 | 2/2021 | Zhu et al. |
| 2021/0153313 A1 | 5/2021 | Li et al. |
| 2021/0195709 A1 | 6/2021 | Li et al. |
| 2021/0204375 A1 | 7/2021 | Li et al. |
| 2022/0038085 A1 | 2/2022 | Zhu et al. |
| 2022/0149829 A1 | 5/2022 | Zhu et al. |
| 2022/0209762 A1 | 6/2022 | Zhu et al. |
| 2022/0210880 A1 | 6/2022 | Li et al. |

(56) References Cited

U.S. PATENT DOCUMENTS

| | | | |
|---|---|---|---|
| 2022/0217824 A1 | 7/2022 | Zhu et al. | |
| 2022/0225480 A1 | 7/2022 | Li et al. | |
| 2022/0225483 A1 | 7/2022 | Yang et al. | |

FOREIGN PATENT DOCUMENTS

| | | |
|---|---|---|
| CN | 101657057 A | 2/2010 |
| CN | 101868090 A | 10/2010 |
| CN | 101896022 A | 11/2010 |
| CN | 101917804 A | 12/2010 |
| CN | 101938865 A | 1/2011 |
| CN | 101998734 A | 3/2011 |
| CN | 102014540 A | 4/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 A | 2/2012 |
| CN | 102387634 A | 3/2012 |
| CN | 102474953 A | 5/2012 |
| CN | 102497706 A | 6/2012 |
| CN | 102612194 A | 7/2012 |
| CN | 202353859 U | 7/2012 |
| CN | 102668717 A | 9/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 A | 1/2013 |
| CN | 102946674 A | 2/2013 |
| CN | 103004290 A | 3/2013 |
| CN | 103024994 A | 4/2013 |
| CN | 103096606 A | 5/2013 |
| CN | 103108470 A | 5/2013 |
| CN | 103260302 A | 8/2013 |
| CN | 103313472 A | 9/2013 |
| CN | 103369802 A | 10/2013 |
| CN | 103379712 A | 10/2013 |
| CN | 103428953 A | 12/2013 |
| CN | 103458579 A | 12/2013 |
| CN | 103547014 A | 1/2014 |
| CN | 103648219 A | 3/2014 |
| CN | 103716934 A | 4/2014 |
| CN | 103781229 A | 5/2014 |
| CN | 103858524 A | 6/2014 |
| CN | 203675408 U | 6/2014 |
| CN | 103945614 A | 7/2014 |
| CN | 103957634 A | 7/2014 |
| CN | 104066254 A | 9/2014 |
| CN | 104619077 A | 5/2015 |
| CN | 204392621 U | 6/2015 |
| CN | 104768265 A | 7/2015 |
| CN | 104902653 A | 9/2015 |
| CN | 105072742 A | 11/2015 |
| CN | 105246218 A | 1/2016 |
| CN | 105265019 A | 1/2016 |
| CN | 105423140 A | 3/2016 |
| CN | 105591553 A | 5/2016 |
| CN | 105873269 A | 8/2016 |
| CN | 105992440 A | 10/2016 |
| CN | 106105395 A | 11/2016 |
| CN | 106163009 A | 11/2016 |
| CN | 205812458 U | 12/2016 |
| CN | 106332374 A | 1/2017 |
| CN | 106332390 A | 1/2017 |
| CN | 106358337 A | 1/2017 |
| CN | 106413189 A | 2/2017 |
| CN | 206042434 U | 3/2017 |
| CN | 106604460 A | 4/2017 |
| CN | 106793246 A | 5/2017 |
| CN | 106888524 A | 6/2017 |
| CN | 106912144 A | 6/2017 |
| CN | 107046751 A | 8/2017 |
| CN | 107069726 A | 8/2017 |
| CN | 107645804 A | 1/2018 |
| CN | 107995747 A | 5/2018 |
| CN | 107995750 A | 5/2018 |
| CN | 207460551 U | 6/2018 |
| CN | 108337764 A | 7/2018 |
| CN | 108366460 A | 8/2018 |
| CN | 207744191 U | 8/2018 |
| CN | 207910676 U | 9/2018 |
| CN | 108834259 A | 11/2018 |
| CN | 109246885 A | 1/2019 |
| CN | 208572500 U | 3/2019 |
| CN | 109729621 A | 5/2019 |
| CN | 110086362 A | 8/2019 |
| CN | 110099495 A | 8/2019 |
| CN | 110493913 A | 11/2019 |
| EP | 2403318 A1 | 1/2012 |
| EP | 2590477 A1 | 5/2013 |
| EP | 2938164 A2 | 10/2015 |
| JP | 2008-010152 A | 1/2008 |
| JP | 2011-249328 A | 12/2011 |
| TW | 201125441 A | 7/2011 |
| TW | 201132241 A | 9/2011 |
| TW | 201143501 A | 12/2011 |
| TW | 201143530 A | 12/2011 |
| TW | 201146087 A | 12/2011 |
| TW | 201204168 A | 1/2012 |
| TW | 201208463 A | 2/2012 |
| TW | 201208481 A | 2/2012 |
| TW | 201208486 A | 2/2012 |
| TW | 201215228 A | 4/2012 |
| TW | 201233021 A | 8/2012 |
| TW | 201244543 A | 11/2012 |
| TW | I387396 B | 2/2013 |
| TW | 201315118 A | 4/2013 |
| TW | 201322825 A | 6/2013 |
| TW | 201336345 A | 9/2013 |
| TW | 201342987 A | 10/2013 |
| TW | 201348909 A | 12/2013 |
| TW | I422130 B | 1/2014 |
| TW | I423732 B | 1/2014 |
| TW | 201412189 A | 3/2014 |
| TW | 201414146 A | 4/2014 |
| TW | I434616 B | 4/2014 |
| TW | M477115 U | 4/2014 |
| TW | 201417626 A | 5/2014 |
| TW | 201417631 A | 5/2014 |
| TW | 201422045 A | 6/2014 |
| TW | 201424454 A | 6/2014 |
| TW | I441428 B | 6/2014 |
| TW | I448198 B | 8/2014 |
| TW | 201503756 A | 1/2015 |
| TW | 201515514 A | 4/2015 |
| TW | I496502 B | 8/2015 |
| TW | 201603644 A | 1/2016 |
| TW | 201607368 A | 2/2016 |
| TW | I524814 B | 3/2016 |
| TW | I535175 B | 5/2016 |
| TW | I540809 B | 7/2016 |
| TW | 201630468 A | 8/2016 |
| TW | 201639415 A | 11/2016 |
| TW | I630842 B | 7/2018 |
| TW | 201909699 A | 3/2019 |
| TW | 201927074 A | 7/2019 |
| WO | 2008/112820 A2 | 9/2008 |

OTHER PUBLICATIONS

China Patent Office, Office Action dated Apr. 15, 2021, in Application No. 201911371960.8.
China Patent Office, Office Action dated Apr. 30, 2021, in Application No. 201910719931.X.
China Patent Office, Office Action dated Aug. 28, 2015, in Application No. 201410322602.9.
China Patent Office, Office Action dated Aug. 8, 2015, in Application No. 201410172086.6.
China Patent Office, Office Action dated Dec. 14, 2015, in Application No. 201210166672.0.
China Patent Office, Office Action dated Dec. 3, 2018, in Application No. 201710557179.4.

(56) References Cited

OTHER PUBLICATIONS

China Patent Office, Office Action dated Feb. 1, 2021, in Application No. 201911140844.5.
China Patent Office, Office Action dated Feb. 3, 2021, in Application No. 201911316902.5.
China Patent Office, Office Action dated Jan. 17, 2022, in Application No. 201910124049.0.
China Patent Office, Office Action dated Jan. 9, 2020, in Application No. 201710828263.5.
China Patent Office, Office Action dated Jul. 7, 2014, in Application No. 201210468505.1.
China Patent Office, Office Action dated Jun. 3, 2014, in Application No. 201110103130.4.
China Patent Office, Office Action dated Jun. 30, 2015, in Application No. 201410171893.6.
China Patent Office, Office Action dated Mar. 2, 2016, in Application No. 201410172086.6.
China Patent Office, Office Action dated Mar. 22, 2016, in Application No. 201410322612.2.
China Patent Office, Office Action dated Mar. 22, 2019, in Application No. 201711464007.9.
China Patent Office, Office Action dated May 26, 2021, in Application No. 201910124049.0.
China Patent Office, Office Action dated Nov. 15, 2014, in Application No. 201210166672.0.
China Patent Office, Office Action dated Nov. 15, 2021, in Application No. 201911316902.5.
China Patent Office, Office Action dated Nov. 2, 2020, in Application No. 201910124049.0.
China Patent Office, Office Action dated Nov. 23, 2021, in Application No. 201911140844.5.
China Patent Office, Office Action dated Nov. 29, 2018, in Application No. 201710828263.5.
China Patent Office, Office Action dated Oct. 19, 2015, in Application No. 201410322612.2.
China Patent Office, Office Action dated Sep. 2, 2016, in Application No. 201510103579.9.
Qi et al., "Sine Wave Dimming Circuit Based on PIC16 MCU," Electronic Technology Application in 2014, vol. 10, (2014).
Taiwan Intellectual Property Office, Office Action dated Apr. 18, 2016, in Application No. 103140989.
Taiwan Intellectual Property Office, Office Action dated Apr. 27, 2020, in Application No. 108116002.
Taiwan Intellectual Property Office, Office Action dated Apr. 7, 2021, in Application No. 109111042.
Taiwan Intellectual Property Office, Office Action dated Aug. 23, 2017, in Application No. 106103535.
Taiwan Intellectual Property Office, Office Action dated Aug. 27, 2020, in Application No. 107107508.
Taiwan Intellectual Property Office, Office Action dated Dec. 27, 2019, in Application No. 108116002.
Taiwan Intellectual Property Office, Office Action dated Feb. 11, 2020, in Application No. 107107508.
Taiwan Intellectual Property Office, Office Action dated Feb. 27, 2018, in Application No. 106136242.
Taiwan Intellectual Property Office, Office Action dated Feb. 6, 2018, in Application No. 106130686.
Taiwan Intellectual Property Office, Office Action dated Jan. 14, 2019, in Application No. 107107508.
Taiwan Intellectual Property Office, Office Action dated Jan. 21, 2021, in Application No. 109108798.
Taiwan Intellectual Property Office, Office Action dated Jan. 4, 2021, in Application No. 109111042.
Taiwan Intellectual Property Office, Office Action dated Jan. 7, 2014, in Application No. 100119272.
Taiwan Intellectual Property Office, Office Action dated Jun. 16, 2020, in Application No. 108136083.
Taiwan Intellectual Property Office, Office Action dated Jun. 9, 2014, in Application No. 101124982.
Taiwan Intellectual Property Office, Office Action dated May 28, 2019, in Application No. 107112306.
Taiwan Intellectual Property Office, Office Action dated Nov. 13, 2015, in Application No. 103141628.
Taiwan Intellectual Property Office, Office Action dated Nov. 30, 2020, in Application No. 107107508.
Taiwan Intellectual Property Office, Office Action dated Oct. 31, 2019, in Application No. 107107508.
Taiwan Intellectual Property Office, Office Action dated Sep. 17, 2015, in Application No. 103127108.
Taiwan Intellectual Property Office, Office Action dated Sep. 17, 2015, in Application No. 103127620.
Taiwan Intellectual Property Office, Office Action dated Sep. 25, 2014, in Application No. 101148716.
Taiwan Intellectual Property Office, Office Action dated Sep. 9, 2020, in Application No. 108148566.
United States Patent and Trademark Office, Notice of Allowance dated Dec. 19, 2022, in U.S. Appl. No. 17/528,153.
United States Patent and Trademark Office, Notice of Allowance dated Feb. 14, 2023, in U.S. Appl. No. 17/520,573.
United States Patent and Trademark Office, Notice of Allowance dated Feb. 8, 2023, in U.S. Appl. No. 17/554,306.
United States Patent and Trademark Office, Notice of Allowance dated Jan. 19, 2023, in U.S. Appl. No. 17/528,153.
United States Patent and Trademark Office, Notice of Allowance dated Nov. 2, 2022, in U.S. Appl. No. 17/023,632.
United States Patent and Trademark Office, Notice of Allowance dated Oct. 4, 2022, in U.S. Appl. No. 17/554,306.
United States Patent and Trademark Office, Notice of Allowance dated Sep. 12, 2022, in U.S. Appl. No. 17/023,632.
United States Patent and Trademark Office, Office Action dated Apr. 26, 2022, in U.S. Appl. No. 17/023,632.
United States Patent and Trademark Office, Office Action dated Dec. 15, 2021, in U.S. Appl. No. 17/023,632.
United States Patent and Trademark Office, Office Action dated Feb. 3, 2023, in U.S. Appl. No. 17/503,238.
United States Patent and Trademark Office, Office Action dated Jan. 26, 2023, in U.S. Appl. No. 17/578,706.
United States Patent and Trademark Office, Office Action dated Jul. 15, 2022, in U.S. Appl. No. 17/528,153.
United States Patent and Trademark Office, Office Action dated Mar. 22, 2023, in U.S. Appl. No. 17/502,916.
United States Patent and Trademark Office, Office Action dated Oct. 19, 2022, in U.S. Appl. No. 17/520,573.
United States Patent and Trademark Office, Office Action dated Oct. 5, 2022, in U.S. Appl. No. 17/502,916.
United States Patent and Trademark Office, Office Action dated Sep. 12, 2022, in U.S. Appl. No. 17/503,238.
United States Patent and Trademark Office, Office Action dated Sep. 14, 2022, in U.S. Appl. No. 17/545,752.
United States Patent and Trademark Office, Office Action dated Sep. 16, 2022, in U.S. Appl. No. 17/578,706.
United States Patent and Trademark Office, Notice of Allowance dated Apr. 12, 2023, in U.S. Appl. No. 17/545,752.
United States Patent and Trademark Office, Notice of Allowance dated May 30, 2023, in U.S. Appl. No. 17/503,238.
United States Patent and Trademark Office, Notice of Allowance dated Jun. 6, 2023, in U.S. Appl. No. 17/578,706.
United States Patent and Trademark Office, Office Action dated Jun. 12, 2023, in U.S. Appl. No. 18/103,971.
United States Patent and Trademark Office, Office Action dated Sep. 19, 2023, in U.S. Appl. No. 17/502,916.

* cited by examiner

SYSTEMS AND METHODS FOR PROVIDING POWER SUPPLY TO CURRENT CONTROLLERS ASSOCIATED WITH LED LIGHTING

1. CROSS-REFERENCES TO RELATED APPLICATIONS

This application is a continuation of U.S. patent application Ser. No. 17/096,741, filed Nov. 12, 2020, which claims priority to Chinese Patent Application No. 201911316902.5, filed Dec. 19, 2019, both applications being incorporated by reference herein for all purposes.

2. BACKGROUND OF THE INVENTION

Certain embodiments of the present invention are directed to circuits. More particularly, some embodiments of the invention provide systems and methods for providing power supply to current controllers. Merely by way of example, some embodiments of the invention have been applied to light emitting diodes (LEDs). But it would be recognized that the invention has a much broader range of applicability.

With development in the light-emitting diode (LED) lighting market, many LED manufacturers have placed LED lighting products at an important position in market development. The light-emitting diodes are often regulated by a linear constant current circuit of a constant current controller chip. The constant current controller chip usually receives, as an input voltage, a rectified voltage (e.g., VIN) that is generated by a rectifier. When the rectified voltage (e.g., VIN) reaches its valley in magnitude, the input voltage of the constant current controller chip often falls below a threshold voltage, causing the controller chip not to operate normally.

Additionally, the LED lighting products often need dimmer technology to provide consumers with a unique visual experience. Since Triode for Alternating Current (TRIAC) dimmers have been widely used in conventional lighting systems such as incandescent lighting systems, the TRIAC dimmers are also increasingly being used in LED lighting systems. Usually, a TRIAC dimmer clips part of a waveform for the AC input voltage during a dimming off period. During the dimming off period, the rectified voltage (e.g., VIN) often is pulled down in magnitude by a bleeder unit that generates a bleeder current for the TRIAC dimmer, such that the input voltage of the constant current controller chip usually falls below the threshold voltage, causing the controller chip not to operate normally.

To solve these technical problems, the conventional technology often employs an external capacitor, which is used as a power supply to the constant current controller chip when the input voltage falls below the threshold voltage. The external capacitor, however, usually increases the cost of bill of materials (BOM) for the LED lighting system.

Hence it is highly desirable to improve the techniques related to LED lighting systems.

3. BRIEF SUMMARY OF THE INVENTION

Certain embodiments of the present invention are directed to circuits. More particularly, some embodiments of the invention provide systems and methods for providing power supply to current controllers. Merely by way of example, some embodiments of the invention have been applied to light emitting diodes (LEDs). But it would be recognized that the invention has a much broader range of applicability.

According to certain embodiments, a system for controlling one or more light emitting diodes includes: a power supply controller configured to receive a cathode voltage from a cathode of a diode, the diode including an anode configured to receive a rectified voltage generated by a rectifying bridge, the power supply controller being further configured to generate a first signal based at least in part on the cathode voltage; and a driver configured to receive the first signal and generate a second signal based at least in part on the first signal, the driver being further configured to output the second signal to a gate terminal of a transistor, the transistor including a source terminal coupled to the driver and a first resistor, the transistor further including a drain terminal coupled to the one or more light emitting diodes and an output capacitor connected to the cathode of the diode; wherein the power supply controller and the driver are further configured to: if the cathode voltage has not remained higher than a predetermined voltage threshold for a time duration that is equal to or longer than a predetermined time threshold, generate the first signal at a first level to keep the transistor turned on, the predetermined time threshold being larger than zero in magnitude; and if the cathode voltage has remained higher than the predetermined voltage threshold for the time duration that is equal to or longer than the predetermined time threshold, generate the first signal at a second level to allow the transistor to be turned on and to be turned off, the second level being different from the first level.

According to some embodiments, a method for controlling one or more light emitting diodes, the method comprising: receiving a cathode voltage from a cathode of a diode, the diode including an anode configured to receive a rectified voltage generated by a rectifying bridge; generating a first signal based at least in part on the cathode voltage; receiving the first signal; generating a second signal based at least in part on the first signal; and outputting the second signal to a gate terminal of a transistor, the transistor including a source terminal coupled to a first resistor, the transistor further including a drain terminal coupled to the one or more light emitting diodes and an output capacitor connected to the cathode of the diode; wherein the generating a first signal based at least in part on the cathode voltage includes: if the cathode voltage has not remained higher than a predetermined voltage threshold for a time duration that is equal to or longer than a predetermined time threshold, generating the first signal at a first level to keep the transistor turned on, the predetermined time threshold being larger than zero in magnitude; and if the cathode voltage has remained higher than the predetermined voltage threshold for the time duration that is equal to or longer than the predetermined time threshold, generating the first signal at a second level to allow the transistor to be turned on and to be turned off, the second level being different from the first level.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for providing power supply to current controllers. Merely by way of example, some embodiments of the invention have been applied to light emitting diodes (LEDs). But it would be recognized that the invention has a much broader range of applicability.

Figure 1:
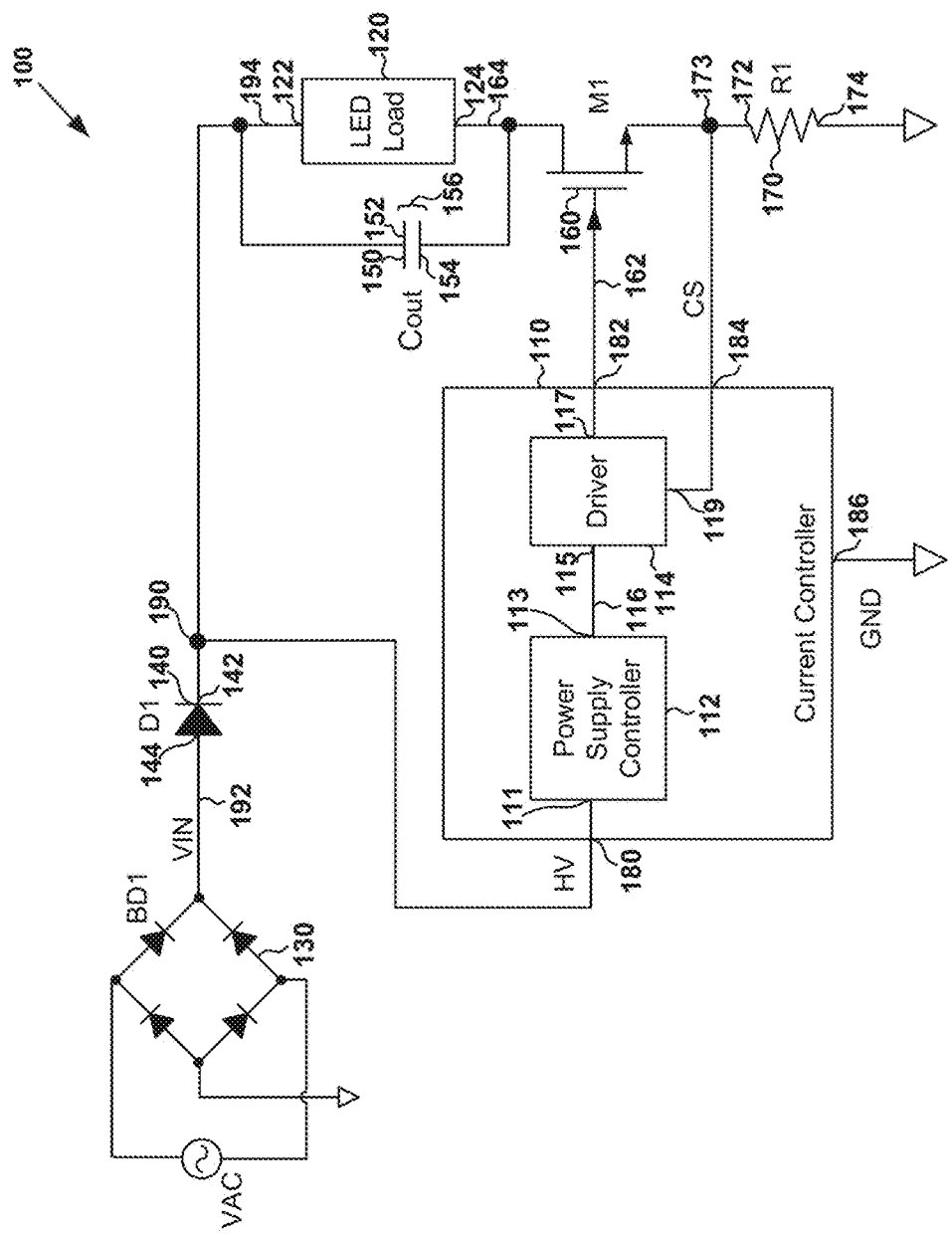
FIG. 1 is a circuit diagram showing an LED lighting system according to some embodiments of the present invention.

FIG. 1 is a circuit diagram showing an LED lighting system according to some embodiments of the present invention. This diagram is merely an example, which should not unduly limit the scope of the claims. One of ordinary skill in the art would recognize many variations, alternatives, and modifications. As shown in FIG. 1, the LED lighting system 100 includes a current controller 110 (e.g., a controller chip), an LED load 120 (e.g., one or more light emitting diodes), a diode 140 (e.g., D1), an output capacitor 150 (e.g., Cout), a transistor 160 (e.g., M1), and a resistor 170 (e.g., R1), and a rectifier 130 (e.g., a bridge rectifier circuit). For example, the transistor 160 (e.g., M1) is a power transistor. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the current controller 110 (e.g., a controller chip) includes a power supply controller 112 and a driver 114. In some examples, the current controller 110 (e.g., a controller chip) also includes terminals 180, 182, 184, and 186 (e.g., pins 180, 182, 184, and 186). In certain examples, the power supply controller 112 provides power supply to other components of the current controller 110, such as providing the power supply to the driver 114. For example, the power supply controller 112 includes terminals 111 and 113. As an example, the driver 114 includes terminals 115, 117, and 119.

In some embodiments, the power supply controller 112 receives a voltage 190 at the terminal 111 through the terminal 180 (e.g., the HV terminal). As an example, the terminal 180 is connected to a cathode 142 of the diode 140 and a terminal 152 of the output capacitor 150. For example, the diode 140 also includes an anode 144, which receives a voltage 192 (e.g., a rectified voltage VIN). In certain examples, the rectifier 130 (e.g., a bridge rectifier circuit) of the LED lighting system 100 receives an AC input voltage (e.g., VAC), generates the voltage 192 (e.g., a rectified voltage VIN), and outputs the voltage 192 (e.g., a rectified voltage VIN) to the anode 144 of the diode 140. For example, the rectifier 130 includes a full-wave rectifier circuit. As an example, the rectifier 130 includes an half-wave rectifier circuit. In some examples, the terminal 113 of the power supply controller 112 is connected to the terminal 115 of the driver 114. For example, the power supply controller 112 outputs a signal 116 at the terminal 113, and the signal 116 is received by the driver 114 at the terminal 115. As an example, the signal 116 is a logic signal. In certain examples, the terminal 117 of the driver 114 is connected to a gate terminal of the transistor 160.

In certain embodiments, the output capacitor 150 also includes a terminal 154. For example, the terminal 154 is connected to a drain terminal of the transistor 160. In some examples, the transistor 160 includes the gate terminal, the drain terminal, and also a source terminal. As an example, the source terminal of the transistor 160 is connected to a terminal 172 of the resistor 170, which also includes a terminal 174. For example, the terminal 174 is connected to the ground to receive the ground voltage.

According to some embodiments, the LED load 120 (e.g., one or more light emitting diodes) includes terminals 122 and 124. In certain examples, the terminal 122 is connected to the terminal 152 of the output capacitor 150, and the terminal 124 is connected to the terminal 154 of the output capacitor 150. For example, a voltage drop 156 represents the voltage drop between the terminal 152 of the output capacitor 150 and the terminal 154 of the output capacitor 150. In some examples, the LED load 120 includes multiple light emitting diodes connected in parallel and/or multiple light emitting diodes connected in series. As an example, the LED load 120 includes one or more in-line light emitting diodes. For example, the LED load 120 includes one or more surface mounted light emitting diodes.

According to certain embodiments, the terminal 172 of the resistor 170 is connected to the source terminal of the transistor 160 and is also connected to the terminal 119 of the driver 114 through the terminal 184 (e.g., CS) of the current controller 110. For example, the resistor 170 generates a feedback voltage 173 at the terminal 172, and the feedback voltage 173 is also received by the terminal 119 of the driver 114 to form a negative feedback loop. In certain examples, during normal operation of the LED lighting system 100, the driver 114 generates a gate voltage 162 based on the feedback voltage 173, and outputs the gate voltage 162 to the gate terminal of the transistor 160 in order to control a current 194 that flows through the LED load 120. For example, during normal operation of the LED lighting system 100, the driver 114 performs liner constant current control and keeps the current 194 at a constant magnitude. In some examples, the voltage 190 changes from zero to a peak value, and the peak value is equal to $\sqrt{2}$ multiplied by the root-mean-squared (RMS) value of an AC input voltage (e.g., VAC). For example, the root-mean-squared (RMS) value of the AC input voltage (e.g., VAC) is equal to 110 volts. As an example, the root-mean-squared (RMS) value of the AC input voltage (e.g., VAC) is equal to 220 volts.

As shown in FIG. 1, when the LED lighting system 100 starts up, the voltage 192 (e.g., the rectified voltage VIN) is used to provide power to the current controller 110 (e.g., a controller chip), and the power supply controller 112 of the current controller 110 (e.g., a controller chip) is used to control the transistor 160 to keep the transistor 160 closed (e.g., turned on) during an initial stage according to certain embodiments. For example, the initial stage lasts longer than at least one cycle of the voltage 192 (e.g., the rectified voltage VIN). As an example, one cycle of the voltage 192 (e.g., the rectified voltage VIN) is equal to half a cycle of the AC input voltage (e.g., VAC).

In some embodiments, during the initial stage, the transistor 160 remains closed (e.g., turned on) in order to charge the output capacitor 150. For example, the transistor 160 remains turned on in the linear region during the initial stage. As an example, the transistor 160 remains turned on in the saturation region during the initial stage. In certain examples, the current controller 110 (e.g., a controller chip) is used to control a current 164 that flows through the transistor 160 when the transistor 160 is turned on in order to control a charging current of the output capacitor 150 during the initial stage.

In certain embodiments, the initial stage of the LED lighting system 100 ends and the normal operation stage of the LED lighting system 100 starts when the output capacitor 150 is sufficiently charged so that the voltage drop 156 of the output capacitor 150 can ensure the current controller 110 (e.g., a controller chip) to operate normally without interruption during the normal operation stage. As an example, during the normal operation stage, the LED lighting system 100 performs normal operation. In some examples, after the initial stage of the LED lighting system 100 ends, the current controller 110 (e.g., a controller chip) operates normally without interruption while being powered by the voltage 192 (e.g., a rectified voltage VIN) and/or the voltage drop 156 of the output capacitor 150 during the normal operation stage. For example, if the voltage 192 (e.g., a rectified voltage VIN) is larger than the voltage 190, the diode 140 is forward biased and the voltage 192 (e.g., a rectified voltage VIN) provides power to the current controller 110 (e.g., a controller chip). As an example, if the voltage 192 (e.g., a rectified voltage VIN) is smaller than the voltage 190, the diode 140 is reverse biased and the voltage drop 156 of the output capacitor 150 provides power to the current controller 110 (e.g., a controller chip).

According to some embodiments, the LED lighting system 100 operates in two stages including the initial stage and the normal operation stage. In certain examples, during the initial stage, the transistor 160 remains turned on. For example, the current controller 110 (e.g., a controller chip) is powered by the voltage 192 (e.g., a rectified voltage VIN) during the initial stage. In some examples, the initial stage of the LED lighting system 100 ends and the normal operation stage of the LED lighting system 100 starts when the voltage drop 156 of the output capacitor 150 becomes able to ensure the current controller 110 (e.g., a controller chip) to operate normally without interruption during the normal operation stage. For example, during the normal operation stage, the current controller 110 (e.g., a controller chip) operates normally without interruption while being powered by the voltage 192 (e.g., a rectified voltage VIN) and/or the voltage drop 156 of the output capacitor 150. As an example, if the voltage 192 (e.g., a rectified voltage VIN) is larger than the voltage 190, the diode 140 is forward biased and the voltage 192 (e.g., a rectified voltage VIN) provides power to the current controller 110 (e.g., a controller chip), and if the voltage 192 (e.g., a rectified voltage VIN) is smaller than the voltage 190, the diode 140 is reverse biased and the voltage drop 156 of the output capacitor 150 provides power to the current controller 110 (e.g., a controller chip).

As discussed above and further emphasized here, FIG. 1 is merely an example, which should not unduly limit the scope of the claims. One of ordinary skill in the art would recognize many variations, alternatives, and modifications.

In some embodiments, the LED lighting system 100 also includes a rectifier (e.g., a bridge rectifier circuit) that generates the voltage 192 (e.g., a rectified voltage VIN). For example, the rectifier of the LED lighting system 100 receives an AC input voltage (e.g., VAC) and generates the voltage 192 (e.g., a rectified voltage VIN). As an example, the rectifier of the LED lighting system 100 includes a full-wave rectifier circuit and/or an half-wave rectifier circuit. In certain embodiments, the resistor 170 (e.g., R1) includes multiple resistors in series and/or multiple resistors in parallel.

Figure 2:
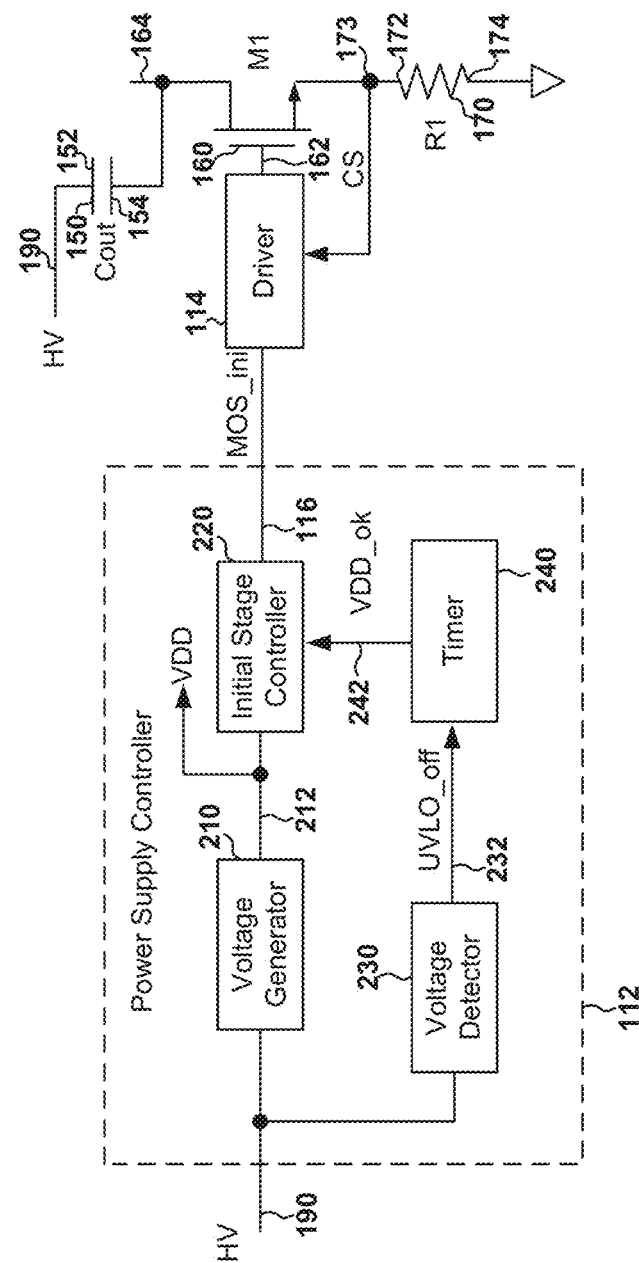
FIG. 2 is a circuit diagram showing certain components of the power supply controller as part of the LED lighting system as shown in FIG. 1 according to certain embodiments of the present invention.

FIG. 2 is a circuit diagram showing certain components of the power supply controller 112 as part of the LED lighting system 100 as shown in FIG. 1 according to certain embodiments of the present invention. This diagram is merely an example, which should not unduly limit the scope of the claims. One of ordinary skill in the art would recognize many variations, alternatives, and modifications. As shown in FIG. 2, the power supply controller 112 includes a voltage generator 210, an initial stage controller 220, a voltage detector 230, and a timer 240. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the voltage generator 210 and the initial stage controller 220 (e.g., an operation controller) are configured to keep the transistor 160 (e.g., M1) closed (e.g., turned off) during the initial stage. In certain embodiments, the voltage detector 230 and the timer 240 are configured to determine whether the voltage drop 156 of the terminal 152 of the output capacitor 150 becomes able to ensure the current controller 110 (e.g., a controller chip) to operate normally without interruption, so that the LED lighting system 100 changes from the initial stage to the normal operation stage.

According to some embodiments, the voltage generator 210 receives the voltage 190 and generates a voltage 212 (e.g., VDD). For example, the voltage 212 (e.g., VDD) is received as power supply by one or more components of the current controller 110 (e.g., a controller chip). In certain examples, the voltage 212 (e.g., VDD) is received as power supply by the initial stage controller 220 (e.g., an operation controller), and the initial stage controller 220 (e.g., an operation controller) is coupled to the voltage generator 210. For example, the initial stage controller 220 also receives a signal 242 and generates the signal 116 (e.g., MOS_ini). As an example, the signal 116 (e.g., MOS_ini) is a logic signal.

According to certain embodiments, the signal 116 (e.g., MOS_ini) is received by the driver 114. As an example, the power supply controller 112 generates the signal 116 (e.g., MOS_ini) and outputs the signal 116 (e.g., MOS_ini) to the driver 114. For example, the driver 114 generates the gate voltage 162 based at least in part on the signal 116 (e.g., MOS_ini). In some examples, the gate voltage 162 is received by the gate terminal of the transistor 160. As an example, the transistor 160 is an NMOS transistor, and if the gate voltage 162 is at a high voltage level, the transistor 160 is turned on to form a conducting path to the ground for charging the output capacitor 150.

Figure 4:
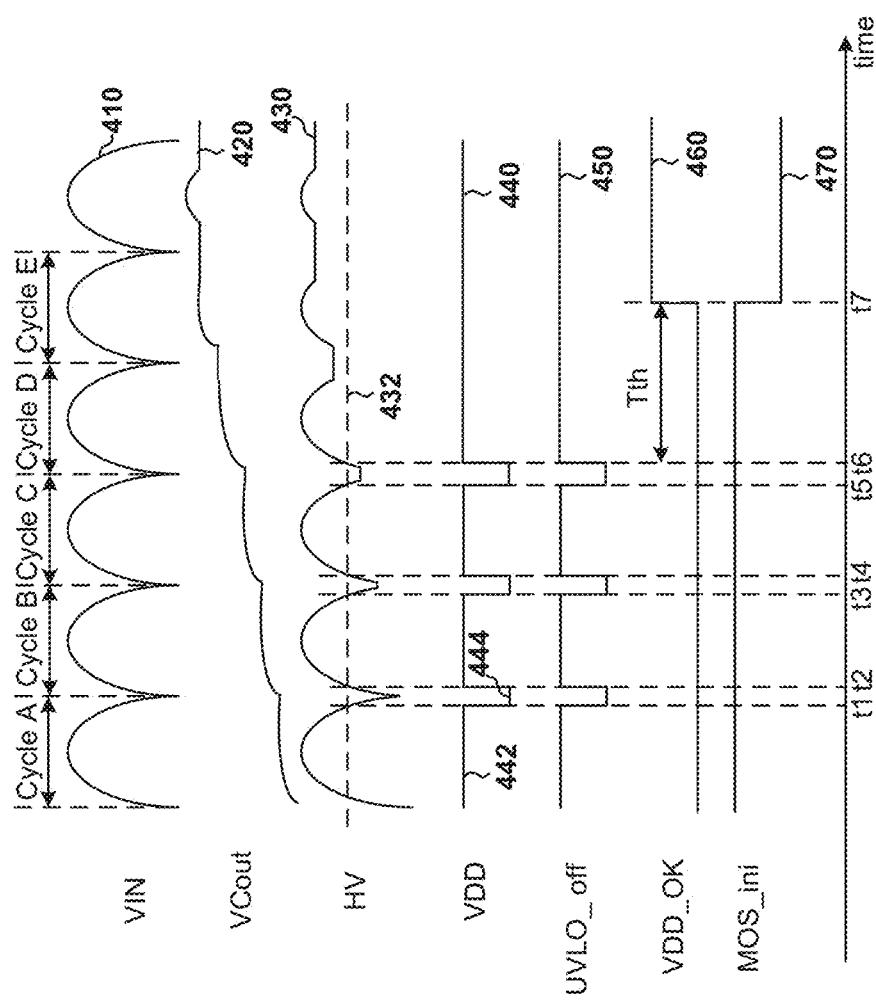
FIG. 4 shows simplified timing diagrams for the LED lighting system as shown in FIG. 1 and FIG. 2 according to some embodiments.

In some embodiments, the voltage detector 230 receives the voltage 190, detects the received voltage 190, determines whether the detected voltage 190 is larger than an operation voltage threshold of the current controller 110 (e.g., a controller chip), and generates a signal 232 (e.g., UVLO_off). In some examples, the operation voltage threshold (e.g., the voltage threshold 432 as shown in FIG. 4) of the current controller 110 (e.g., a controller chip) represents the minimum power supply (e.g., the minimum voltage) that the current controller 110 needs in order to operate normally. For example, if the voltage 190 is higher than the operation voltage threshold, the current controller 110 can operate normally. As an example, if the voltage 190 is lower than the operation voltage threshold, the current controller 110 cannot operate normally. In certain examples, if the detected voltage 190 is larger than the operation voltage threshold of the current controller 110 (e.g., a controller chip), the voltage detector 230 generates the signal 232 (e.g., UVLO_off) at a logic high level. As an example, if the detected voltage 190 is not larger than the operation voltage threshold of the current controller 110 (e.g., a controller chip), the voltage detector 230 generates the signal 232 (e.g., UVLO_off) at a logic low level.

In certain embodiments, the signal 232 (e.g., UVLO_off) is received by the timer 240, which is configured to generate the signal 242 based at least in part on the signal 232 (e.g., UVLO_off). For example, if the signal 232 (e.g., UVLO_off) changes from the logic low level to the logic high level, the timer 240 starts counting. As an example, if the signal 232 (e.g., UVLO_off) changes from the logic high level to the logic low level, the timer 240 is rest to zero. In some examples, if the signal 232 (e.g., UVLO_off) changes from the logic low level to the logic high level, the timer 240 starts counting the time duration during which the signal 232 (e.g., UVLO_off) remains at the logic high level. For example, if the counted time duration becomes larger than a predetermined time threshold (e.g., the threshold duration $T_{th}$ as shown in FIG. 4), the timer 240 changes the signal 242 from the logic low level to the logic high level. As an example, the predetermined time threshold (e.g., the threshold duration $T_{th}$ as shown in FIG. 4) is larger than zero. In certain examples, the predetermined time threshold is longer than at least one cycle of the voltage 192 (e.g., the rectified voltage VIN) in duration. For example, the timer 240 measures the counted time duration by the number of cycles of the voltage 192 (e.g., the rectified voltage VIN). As an example, the timer 240 measures the counted time duration by an internal clock of the time 240.

According to some embodiments, the initial stage controller 220 receives the signal 242 and generates the signal 116 (e.g., MOS_ini) based at least in part on the signal 242. For example, if the signal 242 changes from the logic low level to the logic high level, the initial stage controller 220 ends the initial stage of the LED lighting system 100 and starts the normal operation stage of the LED lighting system 100. As an example, during the normal operation stage of the LED lighting system 100, the driver 114 generates the gate voltage 162 based at least in part on the feedback voltage 173 to regulate the current 194 (e.g., to keep the current 194 at a predetermined magnitude).

According to certain embodiments, the voltage generator 210 includes a junction field-effect transistor (JFET) and/or a low dropout regulator (LDO). According to some embodiments, the transistor 160 (e.g., M1) includes a metal oxide semiconductor (e.g., MOS) transistor and/or a bipolar junction transistor. In certain examples, if the signal 116 (e.g., MOS_ini) is at the logic high level, the driver 114 does not change the gate voltage 162 so that the transistor 160 (e.g., M1) remains turned on. For example, the transistor 160 is an NMOS transistor, and if the signal 116 (e.g., MOS_ini) is at the logic high level, the driver 114 keeps the gate voltage 162 at the logic high level so that the transistor 160 (e.g., M1) remains turned on. In some examples, if the signal 116 (e.g., MOS_ini) is at the logic low level, the driver 114 changes the gate voltage 162 so that the transistor 160 (e.g., M1) changes between being turned on and being turned off in order to regulate the current 194 (e.g., to keep the current 194 at a predetermined magnitude) based at least in part on the feedback voltage 173.

Figure 3:
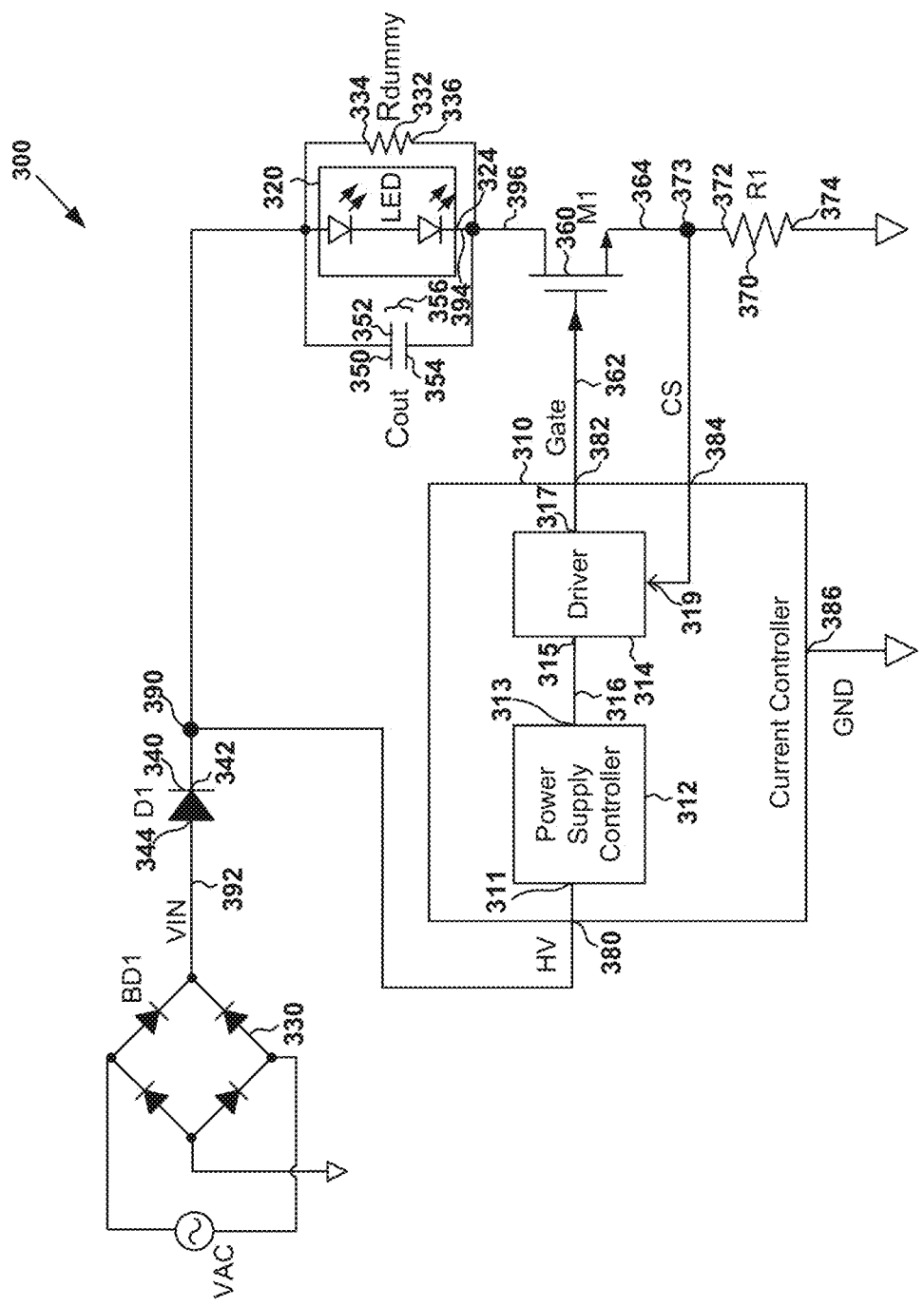
FIG. 3 is a circuit diagram showing an LED lighting system according to certain embodiments of the present invention.

As discussed above and further emphasized here, FIG. 1 and FIG. 2 are merely examples, which should not unduly limit the scope of the claims. One of ordinary skill in the art would recognize many variations, alternatives, and modifications. In some embodiments, the LED lighting system 100 also includes a rectifier (e.g., a bridge rectifier circuit) that generates the voltage 192 (e.g., a rectified voltage VIN). For example, the rectifier of the LED lighting system 100 receives an AC input voltage (e.g., VAC) and generates the voltage 192 (e.g., a rectified voltage VIN). As an example, the rectifier of the LED lighting system 100 includes a full-wave rectifier circuit and/or an half-wave rectifier circuit. In certain embodiments, the LED lighting system 100 also includes a dummy resistor FIG. 3 is a circuit diagram showing an LED lighting system according to certain embodiments of the present invention. This diagram is merely an example, which should not unduly limit the scope of the claims. One of ordinary skill in the art would recognize many variations, alternatives, and modifications. As shown in FIG. 3, the LED lighting system 300 includes a current controller 310 (e.g., a controller chip), an LED load 320 (e.g., one or more light emitting diodes), a diode 340 (e.g., D1), an output capacitor 350 (e.g., Cout), a transistor 360 (e.g., M1), a resistor 370 (e.g., R1), a resistor 332 (e.g., Rdummy), and a rectifier 330 (e.g., a bridge rectifier circuit). For example, the transistor 360 (e.g., M1) is a power transistor. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the current controller 310 (e.g., a controller chip) includes a power supply controller 312 and a driver 314. In some examples, the current controller 310 (e.g., a controller chip) also includes terminals 380, 382, 384, and 386 (e.g., pins 380, 382, 384, and 386). In certain examples, the power supply controller 312 provides power supply to other components of the current controller 310, such as providing the power supply to the driver 314. For example, the power supply controller 312 includes terminals 311 and 313. As an example, the driver 314 includes terminals 315, 317, and 319.

In some embodiments, the power supply controller 312 receives a voltage 390 at the terminal 311 through the terminal 380 (e.g., the HV terminal). As an example, the terminal 380 is connected to a cathode 342 of the diode 340 and a terminal 352 of the output capacitor 350. For example, the diode 340 also includes an anode 344, which receives a voltage 392 (e.g., a rectified voltage VIN). In certain examples, the rectifier 330 (e.g., a bridge rectifier circuit) of the LED lighting system 300 receives an AC input voltage (e.g., VAC), generates the voltage 392 (e.g., a rectified voltage VIN), and outputs the voltage 392 (e.g., a rectified voltage VIN) to the anode 344 of the diode 340. For example, the rectifier 330 includes a full-wave rectifier circuit. As an example, the rectifier 330 includes an half-wave rectifier circuit. In some examples, the terminal 313 of the power supply controller 312 is connected to the terminal 315 of the driver 314. For example, the power supply controller 312 outputs a signal 316 at the terminal 313, and the signal 316 is received by the driver 314 at the terminal 315. As an example, the signal 316 is a logic signal. In certain examples, the terminal 317 of the driver 314 is connected to a gate terminal of the transistor 360.

In certain embodiments, the output capacitor 350 also includes a terminal 354. For example, the terminal 354 is connected to a drain terminal of the transistor 360. In some examples, the resistor 332 (e.g., Rdummy) includes terminals 334 and 336. For example, the terminal 334 of the resistor 332 is connected to the terminal 352 of the output capacitor 350. As an example, the terminal 336 of the resistor 332 is connected to the terminal 354 of the output capacitor 350. In certain examples, the transistor 360 includes the gate terminal, the drain terminal, and also a source terminal. As an example, the source terminal of the transistor 360 is connected to a terminal 372 of the resistor 370, which also includes a terminal 374. For example, the terminal 374 is connected to the ground to receive the ground voltage.

According to some embodiments, the LED load 320 (e.g., one or more light emitting diodes) includes terminals 322 and 324. In certain examples, the terminal 322 is connected to the terminal 352 of the output capacitor 350, and the terminal 324 is connected to the terminal 354 of the output capacitor 350. For example, the terminal 352 of the output capacitor 350 is at a voltage 356. In some examples, the LED load 320 includes multiple light emitting diodes connected in parallel and/or multiple light emitting diodes connected in series. As an example, the LED load 320 includes one or more in-line light emitting diodes. For example, the LED load 320 includes one or more surface mounted light emitting diodes.

According to certain embodiments, the terminal 372 of the resistor 370 is connected to the source terminal of the transistor 360 and is also connected to the terminal 319 of the driver 314 through the terminal 384 (e.g., CS) of the current controller 310. For example, the resistor 370 generates a feedback voltage 373 at the terminal 372, and the feedback voltage 373 is received by the terminal 319 of the driver 314 to form a negative feedback loop. In certain examples, during normal operation of the LED lighting system 300, the driver 314 generates a gate voltage 362 based on the feedback voltage 373, and outputs the gate voltage 362 to the gate terminal of the transistor 360 in order to control a current 396 that flows through the transistor 360, and the current 396 is approximately equal to the current 394 that flows through the LED load 320. For example, during normal operation of the LED lighting system 300, the driver 314 performs liner constant current control and keeps the current 394 at a constant magnitude. In some examples, the voltage 390 changes from zero to a peak value, and the peak value is equal to $\sqrt{2}$ multiplied by the root-mean-squared (RMS) value of an AC input voltage (e.g., VAC). For example, the root-mean-squared (RMS) value of the AC input voltage (e.g., VAC) is equal to 110 volts. As an example, the root-mean-squared (RMS) value of the AC input voltage (e.g., VAC) is equal to 220 volts.

As shown in FIG. 3, when the LED lighting system 300 starts up, the voltage 392 (e.g., the rectified voltage VIN) is used to provide power to the current controller 310 (e.g., a controller chip), and the power supply controller 312 of the current controller 310 (e.g., a controller chip) is used to control the transistor 360 to keep the transistor 360 closed (e.g., turned on) during an initial stage according to certain embodiments. For example, the initial stage lasts longer than at least one cycle of the voltage 392 (e.g., the rectified voltage VIN). As an example, one cycle of the voltage 392 (e.g., the rectified voltage VIN) is equal to half a cycle of the AC input voltage (e.g., VAC).

In some embodiments, during the initial stage, the transistor 360 remains closed (e.g., turned on) in order to charge the output capacitor 350. For example, the transistor 360 remains turned on in the linear region during the initial stage. As an example, the transistor 160 remains turned on in the saturation region during the initial stage. In certain examples, the current controller 310 (e.g., a controller chip) is used to control a current 364 that flows through the transistor 360 when the transistor 360 is turned on in order to control a charging current of the output capacitor 350 during the initial stage.

In certain embodiments, the initial stage of the LED lighting system 300 ends and the normal operation stage of the LED lighting system 300 starts when the output capacitor 350 is sufficiently charged so that the voltage 356 of the output capacitor 350 can ensure the current controller 310 (e.g., a controller chip) to operate normally without interruption during the normal operation stage. As an example, during the normal operation stage, the LED lighting system 300 performs normal operation. In some examples, after the initial stage of the LED lighting system 300 ends, the current controller 310 (e.g., a controller chip) operates normally without interruption while being powered by the voltage 392 (e.g., a rectified voltage VIN) and/or the voltage 356 of the output capacitor 350 during the normal operation stage. For example, if the voltage 392 (e.g., a rectified voltage VIN) is larger than the voltage 356 of the output capacitor 350, the diode 340 is forward biased and the voltage 392 (e.g., a rectified voltage VIN) provides power to the current controller 310 (e.g., a controller chip). As an example, if the voltage 392 (e.g., a rectified voltage VIN) is smaller than the voltage 356 of the output capacitor 350, the diode 340 is reverse biased and the voltage 356 of the output capacitor 350 provides power to the current controller 310 (e.g., a controller chip).

According to some embodiments, the LED lighting system 300 operates in two stages including the initial stage and the normal operation stage. In certain examples, during the initial stage, the transistor 360 remains turned on. For example, the current controller 310 (e.g., a controller chip) is powered by the voltage 392 (e.g., a rectified voltage VIN) during the initial stage. In some examples, the initial stage of the LED lighting system 300 ends and the normal operation stage of the LED lighting system 300 starts when the voltage 356 of the output capacitor 350 becomes able to ensure the current controller 310 (e.g., a controller chip) to operate normally without interruption during normal operation stage. For example, during the normal operation stage, the current controller 310 (e.g., a controller chip) operates normally without interruption while being powered by the voltage 392 (e.g., a rectified voltage VIN) and/or the voltage 356 of the output capacitor 350. As an example, if the voltage 392 (e.g., a rectified voltage VIN) is larger than the voltage 356 of the output capacitor 350, the diode 340 is forward biased and the voltage 392 (e.g., a rectified voltage VIN) provides power to the current controller 310 (e.g., a controller chip), and if the voltage 392 (e.g., a rectified voltage VIN) is smaller than the voltage 356 of the output capacitor 350, the diode 340 is reverse biased and the voltage 356 of the output capacitor 350 provides power to the current controller 310 (e.g., a controller chip).

According to certain embodiments, the current controller 310 (e.g., a controller chip) is the same as the current controller 110 (e.g., a controller chip), the LED load 320 (e.g., one or more light emitting diodes) is the same as the LED load 120 (e.g., one or more light emitting diodes), the diode 340 (e.g., D1) is the same as the diode 140 (e.g., D1), the output capacitor 350 (e.g., Cout) is the same as the output capacitor 150 (e.g., Cout), the transistor 360 (e.g., M1) is the same as the transistor 160 (e.g., M1), and the resistor 370 (e.g., R1) is the same as the resistor 170 (e.g., R1). For example, the power supply controller 312 is the same as the power supply controller 112, and the driver 314 is the same as the driver 114. As an example, the power supply controller 312 includes the voltage generator 210, the initial stage controller 220, the voltage detector 230, and the timer 240.

As discussed above and further emphasized here, FIG. 3 is merely an example, which should not unduly limit the scope of the claims. One of ordinary skill in the art would recognize many variations, alternatives, and modifications. In certain embodiments, the resistor 370 (e.g., R1) includes multiple resistors in series and/or multiple resistors in parallel.

FIG. 4 shows simplified timing diagrams for the LED lighting system 100 as shown in FIG. 1 and FIG. 2 according to some embodiments. These diagrams are merely examples, which should not unduly limit the scope of the claims. One of ordinary skill in the art would recognize many variations, alternatives, and modifications. As shown in FIG. 3, the waveform 410 represents the voltage 192 (e.g., the rectified voltage VIN) as a function of time, the waveform 420 represents the voltage drop 156 of the output capacitor 150 as a function of time, the waveform 430 represents the voltage 190 as a function of time, the waveform 440 represents the voltage 212 (e.g., VDD) as a function of time, the waveform 450 represents the signal 232 (e.g., UVLO_off) as a function of time, the waveform 460 represents the signal 242 as a function of time, and the waveform 470 represents the signal 116 (e.g., MOS_ini) as a function of time.

As shown by the waveform 410, the voltage 192 (e.g., the rectified voltage VIN) changes as a function of time according to certain embodiments. For example, cycle A, cycle B, cycle C, cycle D, and cycle E each represents one cycle of the voltage 192 (e.g., the rectified voltage VIN). As an example, one cycle of the voltage 192 (e.g., the rectified voltage VIN) is equal to half a cycle of the AC input voltage (e.g., VAC).

As shown by the waveform 420, the voltage drop 156 of the output capacitor 150 changes as a function of time according to some embodiments. In certain examples, the voltage drop 156 increases in magnitude when the output capacitor 150 is being charged during the initial stage of the LED lighting system 100. For example, during the initial stage with the transistor 160 turned on, if the voltage 192 (e.g., a rectified voltage VIN) is larger than the voltage 190, the diode 140 is forward biased and the voltage 192 (e.g., a rectified voltage VIN) is used to charge the output capacitor 150 to increase the voltage drop 156. As an example, during the initial stage with the transistor 160 turned on, if the voltage 192 (e.g., a rectified voltage VIN) is smaller than the voltage 190, the diode 140 is reverse biased and the voltage 192 (e.g., a rectified voltage VIN) is not used to charge the output capacitor 150 so the voltage drop 156 remains unchanged.

As shown by the waveform 430, the voltage 190 changes as a function of time according to certain embodiments. For example, the voltage 190 falls below a voltage threshold 432 (e.g., the operation voltage threshold) at time $t_1$, remains below the voltage threshold 432 (e.g., the operation voltage threshold) from time $t_1$ to time $t_2$, and rises above the voltage threshold 432 (e.g., the operation voltage threshold) at time $t_2$. As an example, the voltage 190 falls below the voltage threshold 432 (e.g., the operation voltage threshold) at time $t_3$, remains below the voltage threshold 432 (e.g., the operation voltage threshold) from time $t_3$ to time $t_4$, and rises above the voltage threshold 432 (e.g., the operation voltage threshold) at time $t_4$. For example, the voltage 190 falls below the voltage threshold 432 (e.g., the operation voltage threshold) at time $t_5$, remains below the voltage threshold 432 (e.g., the operation voltage threshold) from time $t_5$ to time $t_6$, and rises above the voltage threshold 432 (e.g., the operation voltage threshold) at time $t_6$.

In some examples, the voltage threshold 432 (e.g., the operation voltage threshold of the current controller 110) represents the minimum power supply (e.g., the minimum voltage) that the current controller 110 needs in order to operate normally. For example, if the voltage 190 is higher than the voltage threshold 432 (e.g., the operation voltage threshold), the current controller 110 can operate normally. As an example, if the voltage 190 is lower than the voltage threshold 432 (e.g., the operation voltage threshold), the current controller 110 cannot operate normally.

As shown by the waveform 440, the voltage 212 (e.g., VDD) changes as a function of time according to some embodiments. In certain examples, the voltage 212 (e.g., VDD) is at a high voltage level 442 if the voltage 190 is higher than the voltage threshold 432 (e.g., the operation voltage threshold), and the voltage 212 (e.g., VDD) is at a low voltage level 444 if the voltage 190 is higher than the voltage threshold 432 (e.g., the operation voltage threshold). For example, the voltage level 444 changes with time. In some examples, the voltage 212 (e.g., VDD) changes from the high voltage level 442 to the low voltage level 444 at time $t_1$, changes from the low voltage level 444 to the high voltage level 442 at time $t_2$, changes from the high voltage level 442 to the low voltage level 444 at time $t_3$, changes from the low voltage level 444 to the high voltage level 442 at time $t_4$, changes from the high voltage level 442 to the low voltage level 444 at time $t_5$, and changes from the low voltage level 444 to the high voltage level 442 at time $t_6$.

As shown by the waveform 450, the signal 232 (e.g., UVLO_off) changes as a function of time according to some embodiments. In certain examples, the signal 232 (e.g., UVLO_off) is at a logic high level if the voltage 190 is higher than the voltage threshold 432 (e.g., the operation voltage threshold), and the signal 232 (e.g., UVLO_off) is at a logic low level if the voltage 190 is higher than the voltage threshold 432 (e.g., the operation voltage threshold). In some examples, the signal 232 (e.g., UVLO_off) changes from the logic high level to the logic low level at time $t_1$, changes from the logic low level to the logic high level at time $t_2$, changes from the logic high level to the logic low level at time $t_3$, changes from the logic low level to the logic high level at time $t_4$, changes from the logic high level to the logic low level at time $t_5$, and changes from the logic low level to the logic high level at time $t_6$.

As shown by the waveform 460, the signal 242 changes as a function of time according to certain embodiments. In certain examples, unless the signal 232 (e.g., UVLO_off) remains at the logic high level for a time duration that is equal to or longer than a threshold duration $T_{th}$ (e.g., the predetermined time threshold), the signal 242 is at the logic low level. As an example, the threshold duration $T_{th}$ is larger than zero. For example, if the signal 232 (e.g., UVLO_off) remains at the logic high level for a time duration that is equal to or longer than the threshold duration $T_{th}$ (e.g., the predetermined time threshold), the signal 242 is at the logic high level. As an example, the threshold duration $T_{th}$ (e.g., the predetermined time threshold) is longer than at least one cycle of the voltage 192 (e.g., the rectified voltage VIN) as shown by the waveform 410.

In some examples, the signal 242 is at the logic low level from time $t_1$ to time $t_2$ in response to the signal 232 (e.g., UVLO_off) being at the logic low level from time $t_1$ to time $t_2$. For example, the signal 242 is at the logic low level from time $t_2$ to time $t_3$ in response to the signal 232 (e.g., UVLO_off) being at the logic high level from time $t_2$ to time $t_3$ but changing to the logic low level at time $t_3$, wherein the time duration from time $t_2$ to time $t_3$ is shorter than the threshold duration $T_{th}$ (e.g., the predetermined time threshold). As an example, the signal 242 changes from the logic low level to the logic high level at time $t_7$ in response to the signal 232 (e.g., UVLO_off) remains at the logic high level from time $t_6$ to time $t_7$, wherein the time duration from time $t_6$ to time $t_7$ is equal to the threshold duration $T_{th}$ (e.g., the predetermined time threshold). In certain examples, the signal 242 remains at the logic high level after time $t_7$ in response to the signal 232 (e.g., UVLO_off) remaining at the logic high level since time $t_6$. As an example, at a time after time $t_7$, if the signal 232 (e.g., UVLO_off) changes from the logic high level to the logic low level, the signal 242 changes from the logic high level to the logic low level.

As shown by the waveform 470, the signal 116 (e.g., MOS_ini) changes as a function of time according to some embodiments. In certain examples, the signal 116 (e.g., MOS_ini) is at the logic high level if the signal 242 is at the logic low level, and the signal 116 (e.g., MOS_ini) is at the logic low level if the signal 242 is at the logic high level. For example, from time $t_1$ to time $t_7$, in response to the signal 242 remaining at the logic low level, the signal 116 (e.g., MOS_ini) remains at the logic high level. As an example, at time $t_7$, in response to the signal 242 changing from the logic low level to the logic high level, the signal 116 (e.g., MOS_ini) changes from the logic high level to the logic low level. For example, after time $t_7$, in response to the signal 242 remaining at the logic high level, the signal 116 (e.g., MOS_ini) remains at the logic low level. In some examples, if the signal 242 is at the logic high level, the LED lighting system 100 is in the initial stage, and if the signal 242 is at the logic low level, the LED lighting system 100 is in the normal operation stage. For example, from time $t_1$ to time $t_7$, the signal 242 remains at the logic high level and the LED lighting system 100 is in the initial stage. As an example, at time $t_7$, the signal 242 changes from the logic high level to the logic low level and the LED lighting system 100 changes from the initial stage to the normal operation stage. For example, after time $t_7$, the signal 242 remains at the logic low level and the LED lighting system 100 is in the normal operation stage.

In certain embodiments, during the initial stage of the LED lighting system 100, the driver 114 generates the gate voltage 162 to keep the transistor 160 turned on in order to charge the output capacitor 150. In some embodiments, during the normal operation stage of the LED lighting system 100, the driver 114 generates the gate voltage 162 to change the transistor 160 between being turned on and being turned off based at least in part on the feedback voltage 173 in order to regulate the current 194 (e.g., to keep the current 194 at a predetermined magnitude).

In some embodiments, from time $t_6$ to time $t_7$, the voltage 190 remains higher than the voltage threshold 432 (e.g., the operation voltage threshold) as shown by the waveform 430, the voltage 212 (e.g., VDD) remains at the high voltage level 442 as shown by the waveform 440, and the signal 232 (e.g., UVLO_off) remains at the logic high level by the waveform 450. For example, at time $t_7$, the voltage 190 has remained higher than the voltage threshold 432 (e.g., the operation voltage threshold) for a time duration that is no less than the threshold duration $T_{th}$ (e.g., the predetermined time threshold). As an example, at time $t_7$, the signal 232 (e.g., UVLO_off) changes from the logic low level to the logic high level as shown by the waveform 460, and the signal 116 (e.g., MOS_ini) changes from the logic high level to the logic low level as shown by the waveform 470. In certain examples, the threshold duration $T_{th}$ (e.g., the predetermined time threshold) is longer than at least one cycle of the voltage 192 (e.g., the rectified voltage VIN) as shown by the waveform 410, so if the voltage 190 has remained higher than the voltage threshold 432 (e.g., the operation voltage threshold) for a time duration that is no less than the threshold duration $T_{th}$ (e.g., the predetermined time threshold), the voltage 190 remains higher than the voltage threshold 432 (e.g., the operation voltage threshold) when the voltage 192 (e.g., a rectified voltage VIN) is small (e.g., when the voltage 192 reaches the valley during the cycle of the voltage 192).

As shown in FIG. 4, during the initial stage of the LED lighting system 100, the signal 116 (e.g., MOS_ini) remains at the logic high level (e.g., from time $t_1$ to time $t_7$ as shown by the waveform 470) according to some embodiments. In certain examples, the signal 116 (e.g., MOS_ini) at the logic high level is received by the driver 114, which in response generates the gate voltage 162 to keep the transistor 160 turned on during the initial stage (e.g., to keep the transistor 160 turned on from time $t_1$ to time $t_7$) so that the output capacitor 150 can be charged when the diode 140 is forward biased (e.g., when the voltage 192 is larger than the voltage 190). In some examples, from time $t_1$ to time $t_6$, the voltage drop 156 of the output capacitor 150 cannot ensure the voltage 190 remains higher than the voltage threshold 432 (e.g., the operation voltage threshold) when the voltage 192 (e.g., a rectified voltage VIN) is small (e.g., when the voltage 192 reaches the valley during one cycle of the voltage 192). For example, from time $t_1$ to time $t_2$, from time $t_3$ to time $t_4$, and/or from time is to time $t_6$, the voltage 190 is lower than the voltage threshold 432 (e.g., the operation voltage threshold), and the voltage 212 (e.g., VDD) is at the low voltage level 444 as shown by the waveforms 430 and 440.

As discussed above and further emphasized here, FIG. 4 is merely an example, which should not unduly limit the scope of the claims. One of ordinary skill in the art would recognize many variations, alternatives, and modifications. For example, FIG. 4 shows simplified timing diagrams for the LED lighting system 300 as shown in FIG. 3 according to some embodiments.

Figure 5:
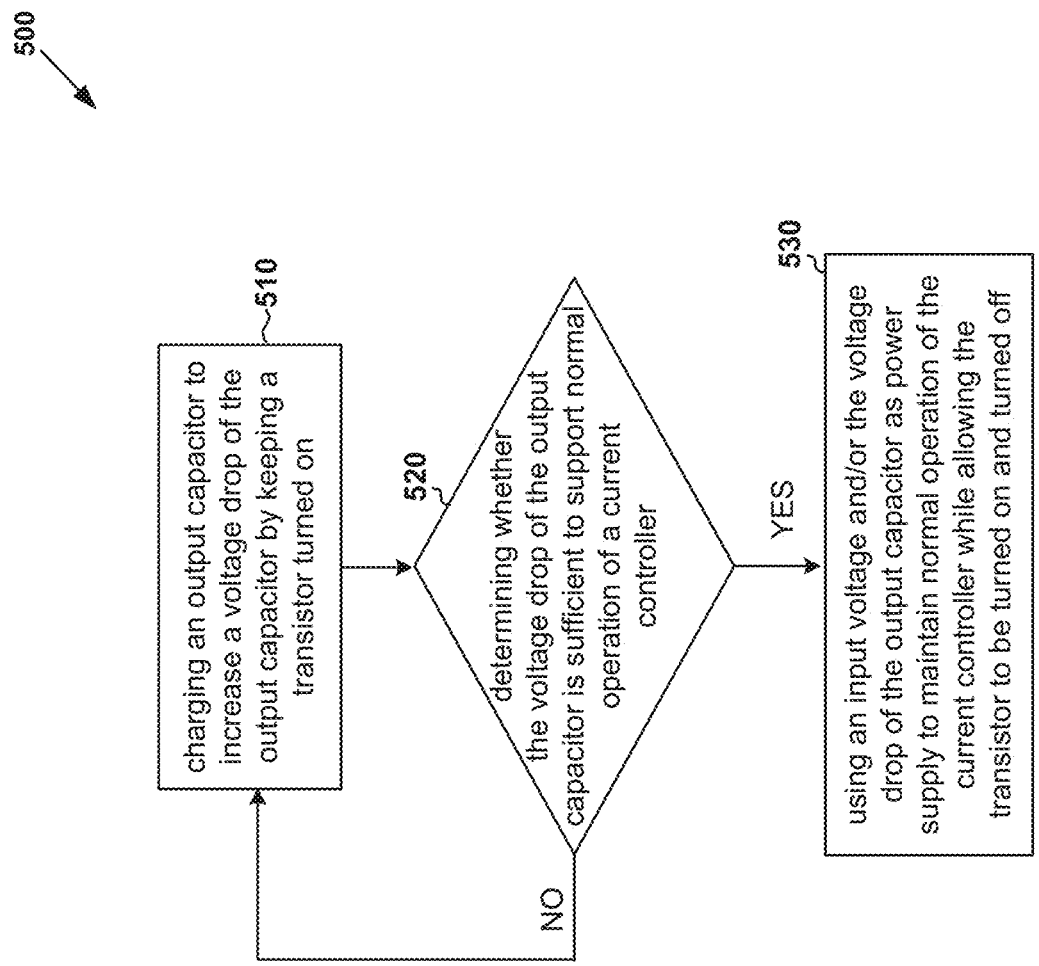
FIG. 5 is a diagram showing a method for the LED lighting system as shown in FIG. 1 and/or the LED lighting system as shown in FIG. 3 according to some embodiments of the present invention.

FIG. 5 is a diagram showing a method for the LED lighting system 100 as shown in FIG. 1 and/or the LED lighting system 300 as shown in FIG. 3 according to some embodiments of the present invention. This diagram is merely an example, which should not unduly limit the scope of the claims. One of ordinary skill in the art would recognize many variations, alternatives, and modifications. The method 500 includes a process 510 for charging an output capacitor to increase a voltage drop of the output capacitor by keeping a transistor turned on, a process 520 for determining whether the voltage drop of the output capacitor is sufficient to support normal operation of a current controller, and a process 530 for using an input voltage and/or the voltage drop of the output capacitor as power supply to maintain normal operation of the current controller while allowing the transistor to be turned on and turned off.

At the process 510, the output capacitor (e.g., the output capacitor 150 and/or the output capacitor 350) is charged to increase the voltage drop of the output capacitor (e.g., the voltage drop 156 of the output capacitor 150 and/or the voltage drop 356 of the output capacitor 350) by keeping the transistor (e.g., the transistor 160 and/or the transistor 360) turned on according to certain embodiments. For example, at the process 510, the LED lighting system 100 and/or the LED lighting system 300 operates in the initial stage. As an example, the process 510 is performed at any time from time $t_1$ to time $t_7$.

At the process 520, it is determined whether the voltage drop of the output capacitor (e.g., the voltage drop 156 and/or the voltage drop 356) is sufficient to support normal operation of the current controller (e.g., the current controller 110 and/or the current controller 310) according to some embodiments. In certain examples, at the process 520, it is determined whether the LED lighting system 100 and/or the LED lighting system 300 needs to continue operating in the initial stage or needs to start operating in the normal operation stage. For example, if it is determined that the LED lighting system 100 and/or the LED lighting system 300 needs to continue operating in the initial stage, the process 510 is performed. As an example, if it is determined that the LED lighting system 100 and/or the LED lighting system 300 needs to start operating in the normal operation stage, the process 530 is performed.

For example, at the time when the process 520 is performed, if the voltage 190 or the voltage 390 has remained higher than the operation voltage threshold (e.g., the voltage threshold 432) for a time duration that is equal to the predetermined time threshold (e.g., the threshold duration $T_{th}$), the voltage drop of the output capacitor (e.g., the voltage drop 156 and/or the voltage drop 356) is determined to be sufficient to support normal operation of the current controller (e.g., the current controller 110 and/or the current controller 310). As an example, at the time when the process 520 is performed, if the voltage 190 or the voltage 390 has not remained higher than the operation voltage threshold (e.g., the voltage threshold 432) for a time duration that is equal to the predetermined time threshold (e.g., the threshold duration $T_{th}$), the voltage drop of the output capacitor (e.g., the voltage drop 156 and/or the voltage drop 356) is determined to be not sufficient to support normal operation of the current controller (e.g., the current controller 110 and/or the current controller 310).

In some examples, if it is determined that the voltage drop of the output capacitor (e.g., the voltage drop 156 and/or the voltage drop 356) is not sufficient to support normal operation of the current controller (e.g., the current controller 110 and/or the current controller 310), the process 510 is performed. In certain examples, if it is determined that the voltage drop of the output capacitor (e.g., the voltage drop 156 and/or the voltage drop 356) is sufficient to support normal operation of the current controller (e.g., the current controller 110 and/or the current controller 310), the process 530 is performed.

At the process 530, the input voltage (e.g. the rectified voltage 192 and/or the rectified voltage 392) and/or the voltage drop of the output capacitor is used as power supply to maintain normal operation of the current controller (e.g., the current controller 110 and/or the current controller 310) while allowing the transistor (e.g., the transistor 160 and/or the transistor 360) to be turned on and turned off according to certain embodiments. In some examples, at the process 530, the normal operation of the LED lighting system 100 and/or the LED lighting system 300 is performed. As an example, under the normal operation of the LED lighting system 100, the driver 114 generates the gate voltage 162 to change the transistor 160 between being turned on and being turned off in order to regulate the current 194 (e.g., to keep the current 194 at a predetermined magnitude) based at least in part on the feedback voltage 173. For example, under the normal operation of the LED lighting system 300, the driver 314 generates the gate voltage 362 to change the transistor 360 between being turned on and being turned off in order to regulate the current 394 (e.g., to keep the current 394 at a predetermined magnitude) based at least in part on the feedback voltage 373.

According to some embodiments, systems and methods provide power supply to a current controller associated with LED lighting, so that during normal operation of the current controller, if the input voltage (e.g., the rectified voltage) is not sufficiently large, the voltage drop of the output capacitor can be used to provide power supply to the current controller. For example, the systems and methods for providing the power supply do not need to use an extra external capacitor, thus lowering costs related to bill of material (BOM). As an example, the systems and methods for providing the power supply can ensure the normal operation of the current controller without interruption even when the input voltage (e.g., the rectified voltage) falls below the operation voltage threshold of the current controller. According to certain embodiments, systems and methods provide power supply to a current controller associated with LED lighting, so that during normal operation of the current controller, the input voltage (e.g., the rectified voltage) or the voltage drop of the output capacitor is used to provide power supply to the current controller.

According to certain embodiments, a system for controlling one or more light emitting diodes includes: a power supply controller configured to receive a cathode voltage from a cathode of a diode, the diode including an anode configured to receive a rectified voltage generated by a rectifying bridge, the power supply controller being further configured to generate a first signal based at least in part on the cathode voltage; and a driver configured to receive the first signal and generate a second signal based at least in part on the first signal, the driver being further configured to output the second signal to a gate terminal of a transistor, the transistor including a source terminal coupled to the driver and a first resistor, the transistor further including a drain terminal coupled to the one or more light emitting diodes and an output capacitor connected to the cathode of the diode; wherein the power supply controller and the driver are further configured to: if the cathode voltage has not remained higher than a predetermined voltage threshold for a time duration that is equal to or longer than a predetermined time threshold, generate the first signal at a first level to keep the transistor turned on, the predetermined time threshold being larger than zero in magnitude; and if the cathode voltage has remained higher than the predetermined voltage threshold for the time duration that is equal to or longer than the predetermined time threshold, generate the first signal at a second level to allow the transistor to be turned on and to be turned off, the second level being different from the first level. For example, the system is implemented according to at least FIG. 1, FIG. 2, FIG. 3, FIG. 4, and/or FIG. 5.

In some examples, the predetermined time threshold is longer than at least one cycle of the rectified voltage in duration. In certain examples, the power supply controller and the driver are further configured to, if the cathode voltage has not remained higher than the predetermined voltage threshold for the time duration that is equal to or longer than the predetermined time threshold, keep the transistor turned on to charge the output capacitor. In some examples, the power supply controller includes: a voltage generator configured to receive the cathode voltage; an operation controller coupled to the voltage generator and configured to generate the first signal; a voltage detector configured to receive the cathode voltage, determine whether the cathode voltage is higher than the predetermined voltage threshold, and generate a third signal indicating whether the cathode voltage is higher than the predetermined voltage threshold; and a timer configured to receive the third signal and generate a timer signal, the timer signal indicating whether the cathode voltage has remained higher than the predetermined voltage threshold for the time duration that is equal to or longer than the predetermined time threshold.

In certain examples, the operation controller is further configured to receive the timer signal and generate the first signal based at least in part on the timer signal. In some examples, the operation controller is further configured to: if the timer signal indicates that the cathode voltage has not remained higher than the predetermined voltage threshold for the time duration that is equal to or longer than the predetermined time threshold, generate the first signal at the first level to keep the transistor turned on; and if the timer signal indicates that the cathode voltage has remained higher than the predetermined voltage threshold for the time duration that is equal to or longer than the predetermined time threshold, generate the first signal at the second level to allow the transistor to be turned on and to be turned off. In certain examples, the driver is further configured to: if the first signal is at the first level, generate the second signal at a third level to turn on the transistor; and if the first signal is at the second level, change the second signal from the third level to a fourth level to turn off the transistor or from the fourth level to the third level to turn on the transistor.

In some examples, the transistor is an NMOS transistor; the third level corresponds to a high voltage level; and the fourth level corresponds to a low voltage level, the low voltage being lower than the high voltage level. In certain examples, the diver is further configured to: receive a feedback signal from the first resistor; and if the first signal is at the second level, change, based at least in part on the feedback signal, the second signal from the third level to the fourth level to turn off the transistor or from the fourth level to the third level to turn on the transistor. In some examples, the diver is further configured to: if the first signal is at the second level, change the second signal, based at least in part on the feedback signal, from the third level to the fourth level to turn off the transistor or from the fourth level to the third level to turn on the transistor, to regulate at a predetermined current magnitude a current that flows through at least the one or more light emitting diodes. In certain examples, the voltage generator includes at least one selected from a group consisting of a junction field-effect transistor and a low dropout regulator. In some examples, the first level corresponds to a logic high level; and the second level corresponds to a logic low level.

According to some embodiments, a method for controlling one or more light emitting diodes, the method comprising: receiving a cathode voltage from a cathode of a diode, the diode including an anode configured to receive a rectified voltage generated by a rectifying bridge; generating a first signal based at least in part on the cathode voltage; receiving the first signal; generating a second signal based at least in part on the first signal; and outputting the second signal to a gate terminal of a transistor, the transistor including a source terminal coupled to a first resistor, the transistor further including a drain terminal coupled to the one or more light emitting diodes and an output capacitor connected to the cathode of the diode; wherein the generating a first signal based at least in part on the cathode voltage includes: if the cathode voltage has not remained higher than a predetermined voltage threshold for a time duration that is equal to or longer than a predetermined time threshold, generating the first signal at a first level to keep the transistor turned on, the predetermined time threshold being larger than zero in magnitude; and if the cathode voltage has remained higher than the predetermined voltage threshold for the time duration that is equal to or longer than the predetermined time threshold, generating the first signal at a second level to allow the transistor to be turned on and to be turned off, the second level being different from the first level. For example, the method is implemented according to at least FIG. 1, FIG. 2, FIG. 3, FIG. 4, and/or FIG. 5.

In certain examples, the predetermined time threshold is longer than at least one cycle of the rectified voltage in duration. In some examples, the outputting the second signal to a gate terminal of a transistor includes: if the cathode voltage has not remained higher than the predetermined voltage threshold for the time duration that is equal to or longer than the predetermined time threshold, keep the transistor turned on to charge the output capacitor. In certain examples, the generating a first signal based at least in part on the cathode voltage further includes: determining whether the cathode voltage is higher than the predetermined voltage threshold; generating a third signal indicating whether the cathode voltage is higher than the predetermined voltage threshold; receiving the third signal; and generating a timer signal indicating whether the cathode voltage has remained higher than the predetermined voltage threshold for the time duration that is equal to or longer than the predetermined time threshold.

In some examples, the generating a first signal based at least in part on the cathode voltage further includes: receiving the timer signal; and generating the first signal based at least in part on the timer signal. In certain examples, the generating the first signal based at least in part on the timer signal includes: if the timer signal indicates that the cathode voltage has not remained higher than the predetermined voltage threshold for the time duration that is equal to or longer than the predetermined time threshold, generating the first signal at the first level to keep the transistor turned on; and if the timer signal indicates that the cathode voltage has remained higher than the predetermined voltage threshold for the time duration that is equal to or longer than the predetermined time threshold, generating the first signal at the second level to allow the transistor to be turned on and to be turned off. In some examples, the generating a second signal based at least in part on the first signal includes: if the first signal is at the first level, generating the second signal at a third level to turn on the transistor; and if the first signal is at the second level, changing the second signal from the third level to a fourth level to turn off the transistor or from the fourth level to the third level to turn on the transistor.

In certain examples, the transistor is an NMOS transistor; the third level corresponds to a high voltage level; and the fourth level corresponds to a low voltage level, the low voltage being lower than the high voltage level. In some examples, the generating a second signal based at least in part on the first signal further includes: receiving a feedback signal from the first resistor; and if the first signal is at the second level, changing, based at least in part on the feedback signal, the second signal from the third level to the fourth level to turn off the transistor or from the fourth level to the third level to turn on the transistor. In certain examples, the changing, based at least in part on the feedback signal, the second signal from the third level to the fourth level to turn off the transistor or from the fourth level to the third level to turn on the transistor if the first signal is at the second level includes: if the first signal is at the second level, changing the second signal, based at least in part on the feedback signal, from the third level to the fourth level to turn off the transistor or from the fourth level to the third level to turn on the transistor, to regulate at a predetermined current magnitude a current that flows through at least the one or more light emitting diodes. In some examples, the first level corresponds to a logic high level; and the second level corresponds to a logic low level.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling one or more light emitting diodes, the system comprising:
   a power supply controller configured to receive a cathode voltage from a cathode of a diode, the diode including an anode configured to receive a rectified voltage generated by a rectifying bridge, the power supply controller being further configured to generate a first signal based at least in part on the cathode voltage; and
   a driver configured to receive the first signal and generate a second signal based at least in part on the first signal;
   wherein the power supply controller and the driver are further configured to:
      if the cathode voltage has not remained higher than a predetermined voltage threshold for a time duration that is equal to or longer than a predetermined time threshold, generate the first signal at a first level to keep a transistor turned on, the predetermined time threshold being larger than zero in magnitude, the transistor being coupled to the one or more light emitting diodes; and
      if the cathode voltage has remained higher than the predetermined voltage threshold for the time duration that is equal to or longer than the predetermined time threshold, generate the first signal at a second level to allow the transistor to be turned on and to be turned off, the second level being different from the first level.

2. The system of claim 1 wherein the predetermined time threshold is longer than at least one cycle of the rectified voltage in duration.

3. The system of claim 1 wherein the power supply controller and the driver are further configured to, if the cathode voltage has not remained higher than the predetermined voltage threshold for the time duration that is equal to or longer than the predetermined time threshold, keep the transistor turned on to charge an output capacitor.

4. The system of claim 1 wherein the power supply controller includes:
   a voltage generator configured to receive the cathode voltage;
   an operation controller coupled to the voltage generator and configured to generate the first signal;
   a voltage detector configured to receive the cathode voltage, determine whether the cathode voltage is higher than the predetermined voltage threshold, and generate a third signal indicating whether the cathode voltage is higher than the predetermined voltage threshold; and
   a timer configured to receive the third signal and generate a timer signal, the timer signal indicating whether the cathode voltage has remained higher than the predetermined voltage threshold for the time duration that is equal to or longer than the predetermined time threshold.

5. The system of claim 4 wherein the operation controller is further configured to receive the timer signal and generate the first signal based at least in part on the timer signal.

6. The system of claim 5 wherein the operation controller is further configured to:
   if the timer signal indicates that the cathode voltage has not remained higher than the predetermined voltage threshold for the time duration that is equal to or longer than the predetermined time threshold, generate the first signal at the first level to keep the transistor turned on; and
   if the timer signal indicates that the cathode voltage has remained higher than the predetermined voltage threshold for the time duration that is equal to or longer than the predetermined time threshold, generate the first signal at the second level to allow the transistor to be turned on and to be turned off.

7. The system of claim 6 wherein the driver is further configured to:
   if the first signal is at the first level, generate the second signal at a third level to turn on the transistor; and
   if the first signal is at the second level, change the second signal from the third level to a fourth level to turn off the transistor or from the fourth level to the third level to turn on the transistor.

8. The system of claim 7 wherein:
   the transistor is an NMOS transistor;
   the third level corresponds to a high voltage level; and
   the fourth level corresponds to a low voltage level, the low voltage being lower than the high voltage level.

9. The system of claim 7 wherein the diver is further configured to:
   receive a feedback signal from the first resistor; and
   if the first signal is at the second level, change, based at least in part on the feedback signal, the second signal from the third level to the fourth level to turn off the transistor or from the fourth level to the third level to turn on the transistor.

10. The system of claim 9 wherein the diver is further configured to:
if the first signal is at the second level, change the second signal, based at least in part on the feedback signal, from the third level to the fourth level to turn off the transistor or from the fourth level to the third level to turn on the transistor, to regulate at a predetermined current magnitude a current that flows through at least the one or more light emitting diodes.

11. The system of claim 4 wherein the voltage generator includes at least one selected from a group consisting of a junction field-effect transistor and a low dropout regulator.

12. The system of claim 1 wherein:
the first level corresponds to a logic high level; and
the second level corresponds to a logic low level.

13. A method for controlling one or more light emitting diodes, the method comprising:
receiving a cathode voltage from a cathode of a diode, the diode including an anode configured to receive a rectified voltage generated by a rectifying bridge;
generating a first signal based at least in part on the cathode voltage;
receiving the first signal; and
generating a second signal based at least in part on the first signal;
wherein the generating a first signal based at least in part on the cathode voltage includes:
if the cathode voltage has not remained higher than a predetermined voltage threshold for a time duration that is equal to or longer than a predetermined time threshold, generating the first signal at a first level to keep a transistor turned on, the predetermined time threshold being larger than zero in magnitude, the transistor being coupled to the one or more light emitting diodes; and
if the cathode voltage has remained higher than the predetermined voltage threshold for the time duration that is equal to or longer than the predetermined time threshold, generating the first signal at a second level to allow the transistor to be turned on and to be turned off, the second level being different from the first level.

14. The method of claim 13 wherein the predetermined time threshold is longer than at least one cycle of the rectified voltage in duration.

15. The method of claim 13 wherein the outputting the second signal to a gate terminal of a transistor includes:
if the cathode voltage has not remained higher than the predetermined voltage threshold for the time duration that is equal to or longer than the predetermined time threshold, keep the transistor turned on to charge an output capacitor.

16. The method of claim 13 wherein the generating a first signal based at least in part on the cathode voltage further includes:
determining whether the cathode voltage is higher than the predetermined voltage threshold;
generating a third signal indicating whether the cathode voltage is higher than the predetermined voltage threshold;
receiving the third signal; and
generating a timer signal indicating whether the cathode voltage has remained higher than the predetermined voltage threshold for the time duration that is equal to or longer than the predetermined time threshold.

17. The method of claim 16 wherein the generating a first signal based at least in part on the cathode voltage further includes:
receiving the timer signal; and
generating the first signal based at least in part on the timer signal.

18. The method of claim 17 wherein the generating the first signal based at least in part on the timer signal includes:
if the timer signal indicates that the cathode voltage has not remained higher than the predetermined voltage threshold for the time duration that is equal to or longer than the predetermined time threshold, generating the first signal at the first level to keep the transistor turned on; and
if the timer signal indicates that the cathode voltage has remained higher than the predetermined voltage threshold for the time duration that is equal to or longer than the predetermined time threshold, generating the first signal at the second level to allow the transistor to be turned on and to be turned off.

19. The method of claim 18 wherein the generating a second signal based at least in part on the first signal includes:
if the first signal is at the first level, generating the second signal at a third level to turn on the transistor; and
if the first signal is at the second level, changing the second signal from the third level to a fourth level to turn off the transistor or from the fourth level to the third level to turn on the transistor.

20. The method of claim 19 wherein:
the transistor is an NMOS transistor;
the third level corresponds to a high voltage level; and
the fourth level corresponds to a low voltage level, the low voltage being lower than the high voltage level.

21. The method of claim 19 wherein the generating a second signal based at least in part on the first signal further includes:
receiving a feedback signal from the first resistor; and
if the first signal is at the second level, changing, based at least in part on the feedback signal, the second signal from the third level to the fourth level to turn off the transistor or from the fourth level to the third level to turn on the transistor.

22. The method of claim 21 wherein the changing, based at least in part on the feedback signal, the second signal from the third level to the fourth level to turn off the transistor or from the fourth level to the third level to turn on the transistor if the first signal is at the second level includes:
if the first signal is at the second level, changing the second signal, based at least in part on the feedback signal, from the third level to the fourth level to turn off the transistor or from the fourth level to the third level to turn on the transistor, to regulate at a predetermined current magnitude a current that flows through at least the one or more light emitting diodes.

23. The method of claim 13 wherein:
the first level corresponds to a logic high level; and
the second level corresponds to a logic low level.

* * * * *